Figure 1:
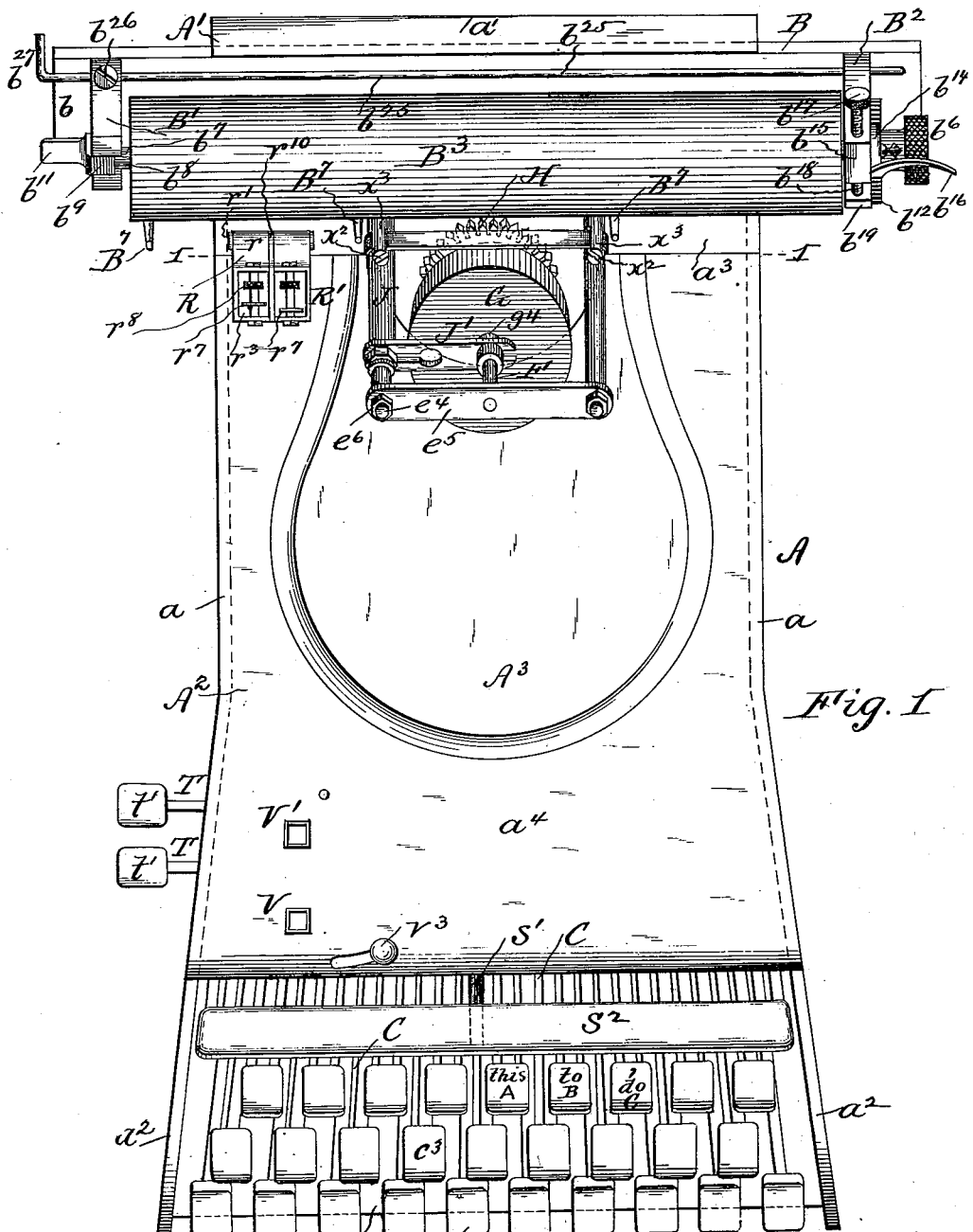

(No Model.) 12 Sheets—Sheet 1.

G. C. BLICKENSDERFER.
TYPE WRITING MACHINE.

No. 457,333. Patented Aug. 4, 1891.

Fig. I.

Witnesses:
M. W. Walker
Chas. F. Van Horn

Inventor,
George C. Blickensderfer
By S. J. Van Stavoren
M. F. Hallock
Attorneys.

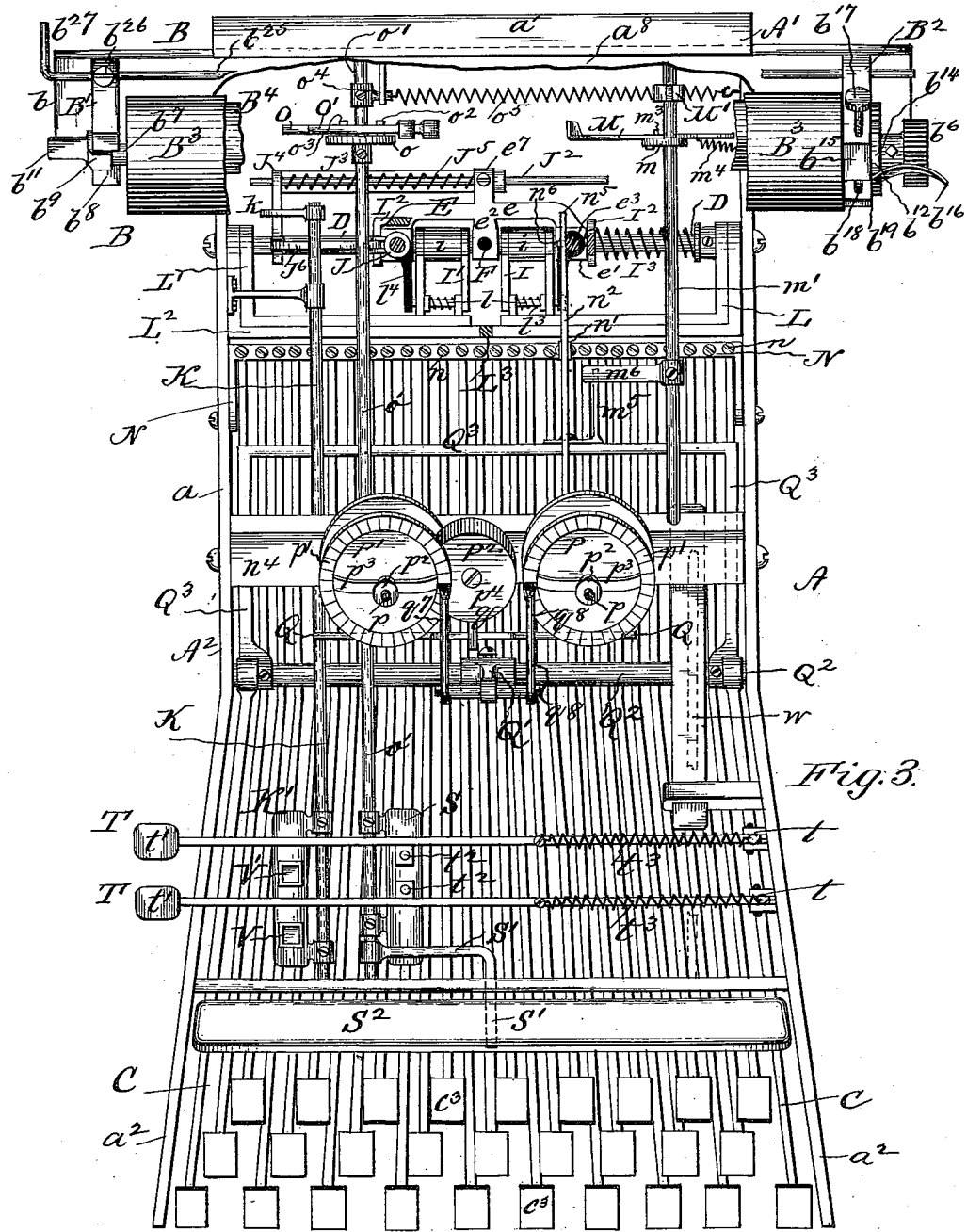

(No Model.) 12 Sheets—Sheet 4.
G. C. BLICKENSDERFER.
TYPE WRITING MACHINE.
No. 457,333. Patented Aug. 4, 1891.
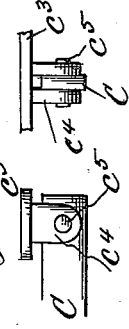
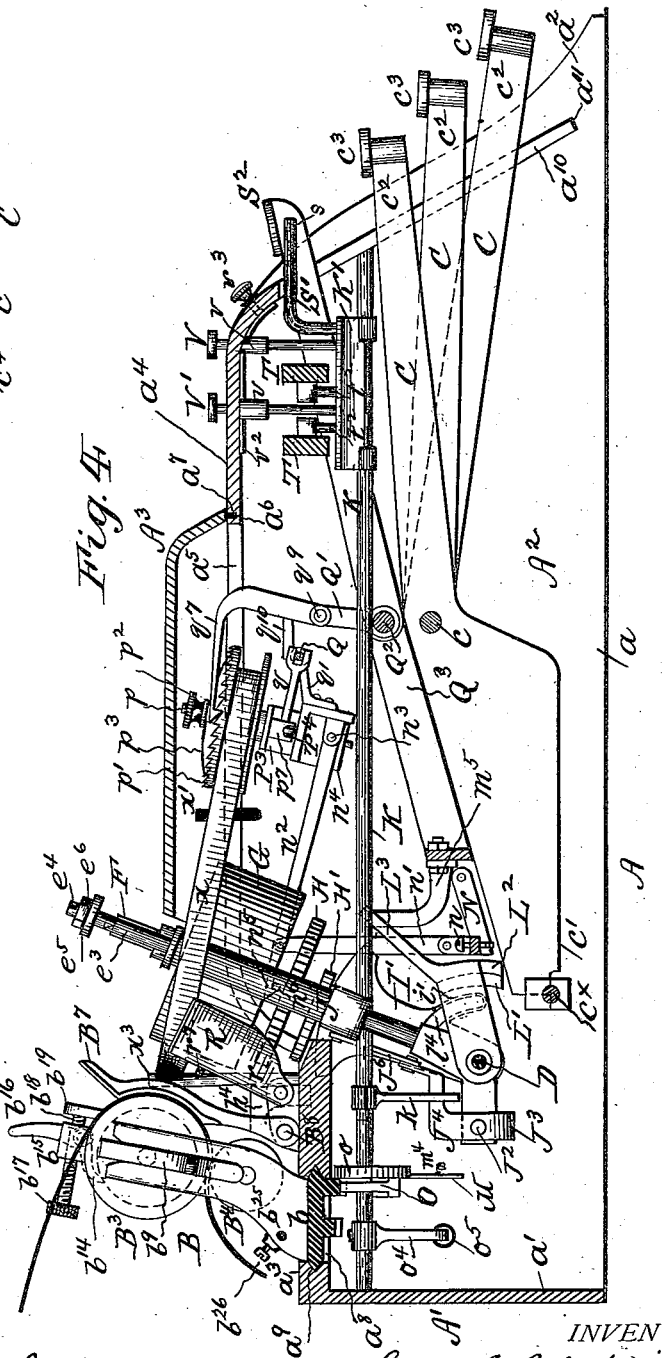
WITNESSES:
M. H. Walker
Chas F. Van Storen
INVENTOR
George C. Blickensderfer
By A. J. Van Storen and
M. F. Halleck
Attorneys (No Model.) 12 Sheets—Sheet 5.
G. C. BLICKENSDERFER.
TYPE WRITING MACHINE.
No. 457,333. Patented Aug. 4, 1891.
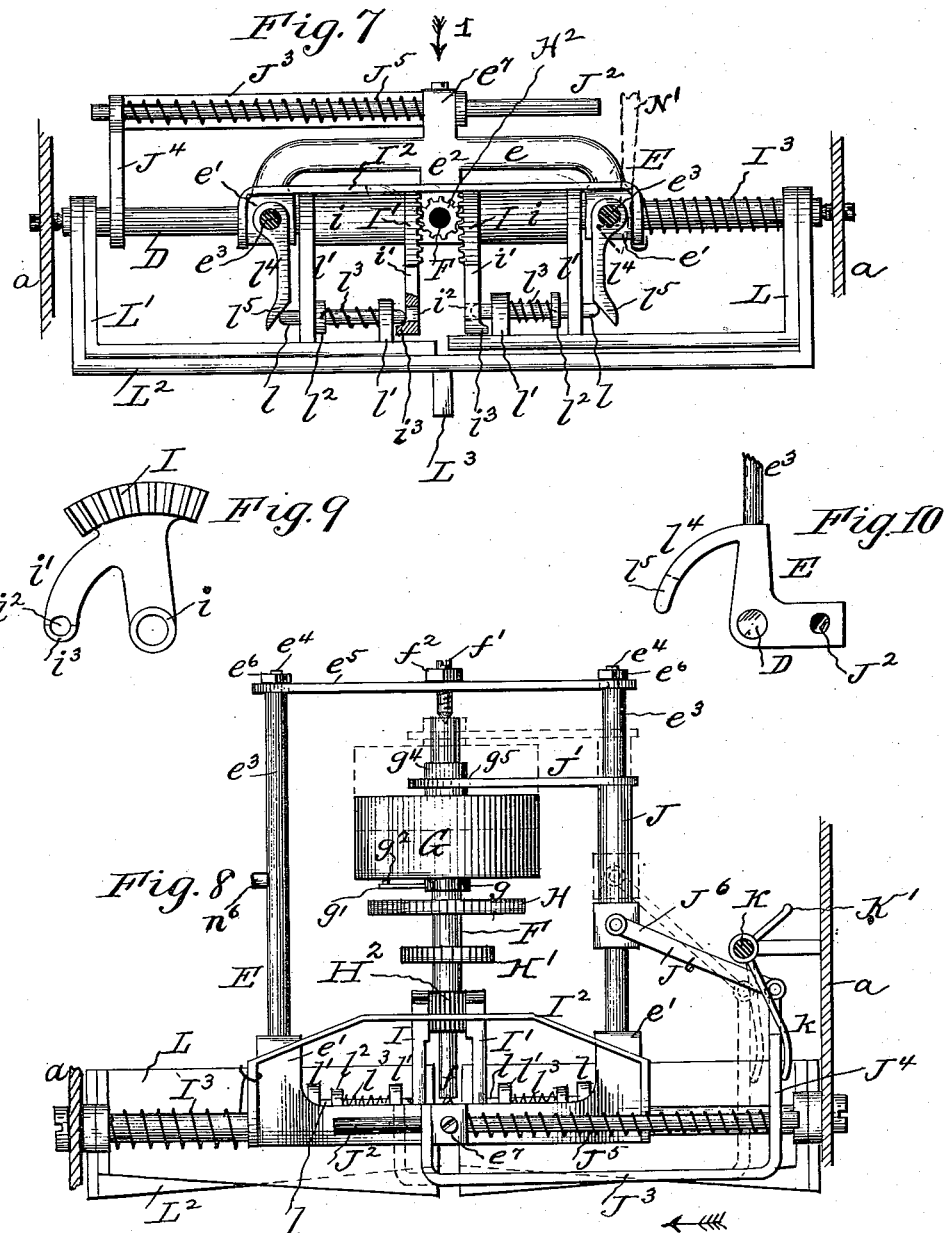

(No Model.) 12 Sheets—Sheet 6.
G. C. BLICKENSDERFER.
TYPE WRITING MACHINE.
No. 457,333. Patented Aug. 4, 1891.
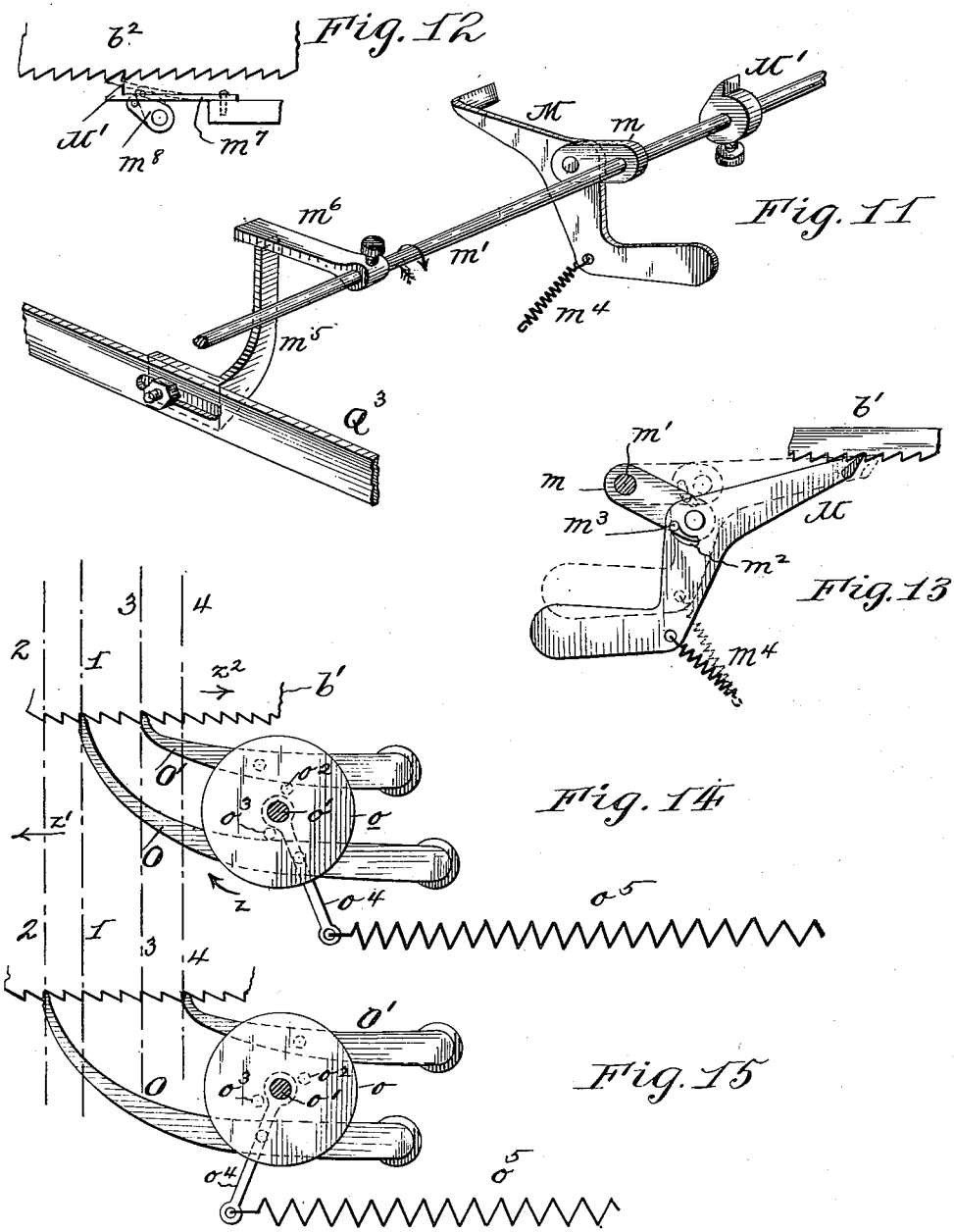
WITNESSES:
INVENTOR,
George C. Blickensderfer
By J. Van Stavoren
M. F. Halleck
attorneys

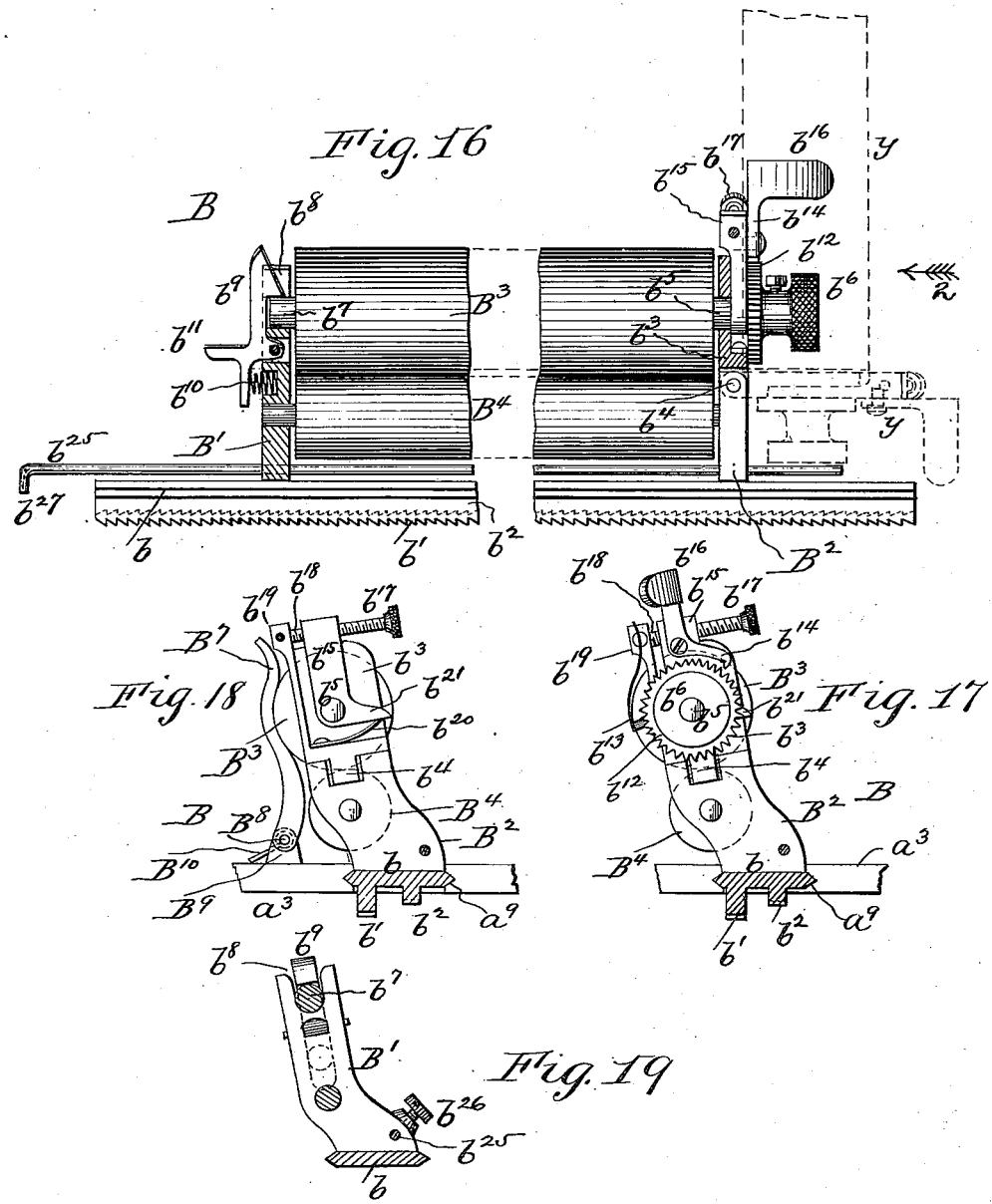

(No Model.) 12 Sheets—Sheet 8.
G. C. BLICKENSDERFER.
TYPE WRITING MACHINE.

No. 457,333. Patented Aug. 4, 1891.

WITNESSES: INVENTOR,
M. W. Walker George C. Blickensderfer
Chas. F. D'Auster By J. Van Stavoren and
M. F. Halleck
Attorneys (No Model.) 12 Sheets—Sheet 9.
G. C. BLICKENSDERFER.
TYPE WRITING MACHINE.

No. 457,333. Patented Aug. 4, 1891.

WITNESSES: INVENTOR, (No Model.)  G. C. BLICKENSDERFER.  12 Sheets—Sheet 10.
TYPE WRITING MACHINE.
No. 457,333. Patented Aug. 4, 1891.
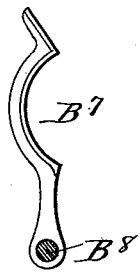
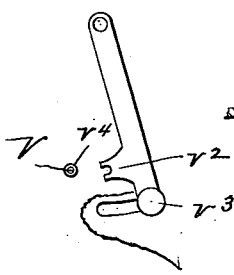
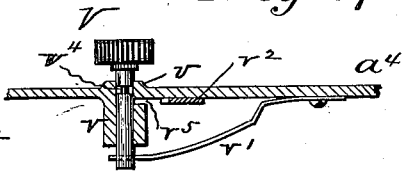
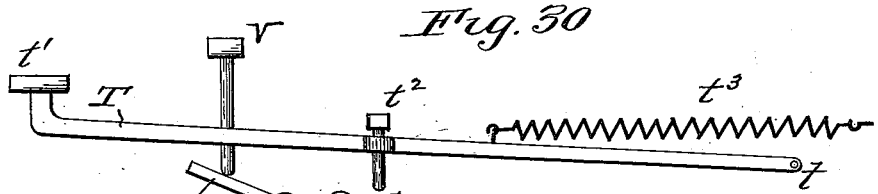
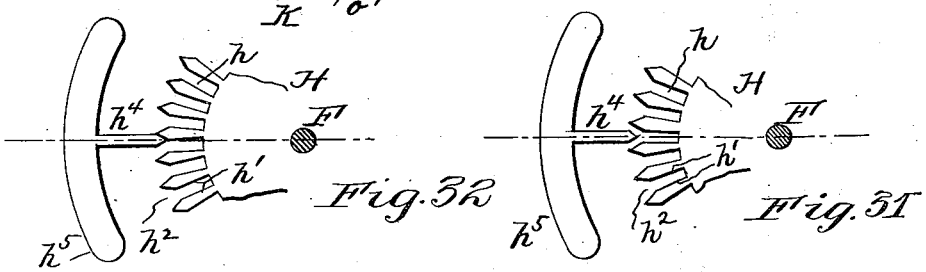
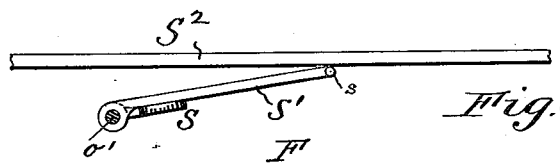
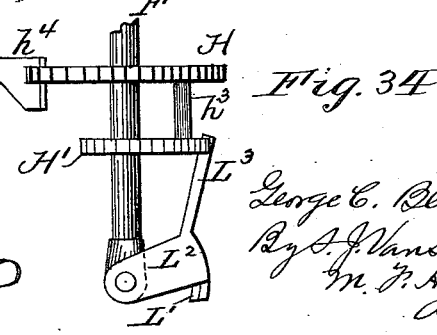
WITNESSES:
M. W. Walker
Chas. F. Van Staorn
INVENTOR,
George C. Blickensderfer
By S. J. Van Staorn and
M. P. Hallock
Attorneys (No Model.) 12 Sheets—Sheet 11.

G. C. BLICKENSDERFER.
TYPE WRITING MACHINE.

No. 457,333. Patented Aug. 4, 1891.

WITNESSES:
M. W. Walker
Chas F. Vanstorp

INVENTOR,
George C. Blickensderfer
By S. J. VanStavoren
M. F. Halleck
Attorneys.

(No Model.) 12 Sheets—Sheet 12.

G. C. BLICKENSDERFER.
TYPE WRITING MACHINE.

No. 457,333. Patented Aug. 4, 1891.

WITNESSES:
M. H. Walker
Chas F. Van Stavoren

INVENTOR,
George C. Blickensderfer
By A. J. Van Stavoren
and M. L. Hallock
Attorneys

UNITED STATES PATENT OFFICE.

GEORGE C. BLICKENSDERFER, OF STAMFORD, CONNECTICUT, ASSIGNOR TO THE BLICKENSDERFER MANUFACTURING COMPANY, OF NEW YORK, N. Y.

TYPE-WRITING MACHINE.

SPECIFICATION forming part of Letters Patent No. 457,333, dated August 4, 1891.

Application filed July 5, 1889. Serial No. 316,591. (No model.)

*To all whom it may concern:*

Be it known that I, GEORGE C. BLICKENSDERFER, a citizen of the United States, residing at Stamford, in the county of Fairfield and State of Connecticut, have invented certain new and useful Improvements in Type-Writing Machines, of which the following is a specification.

My invention has relation to type-writing machines having a type-wheel and propelling mechanism for the type-wheel under the control of a series of key-levers, and particularly to that form of the same wherein the type-wheel shaft is provided with a ratchet moving coincidently with the type-wheel for engagement with a single movable frame for stopping the rotation of the type-wheel to position a letter and for propelling the type-wheel to the paper-carriage to make the impression, as shown, described, and claimed in an application filed by me on the 5th day of July, 1889, Serial No. 316,588.

My invention consists of the combination, constructions, and arrangements of parts, as hereinafter described in the specification, and pointed out in the claims.

Reference is had to the accompanying drawings, wherein—

Figure 2:
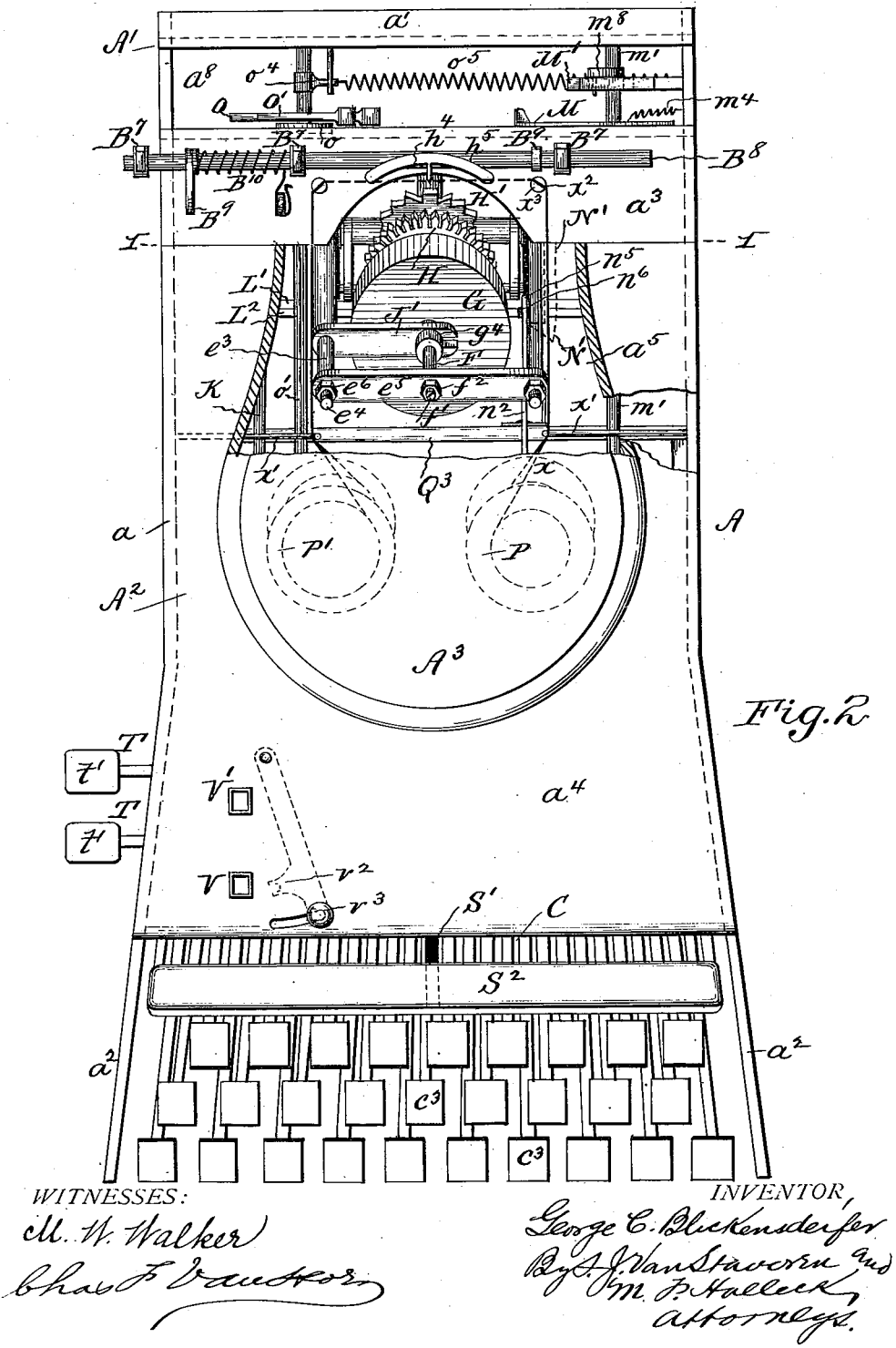
Figure 20:
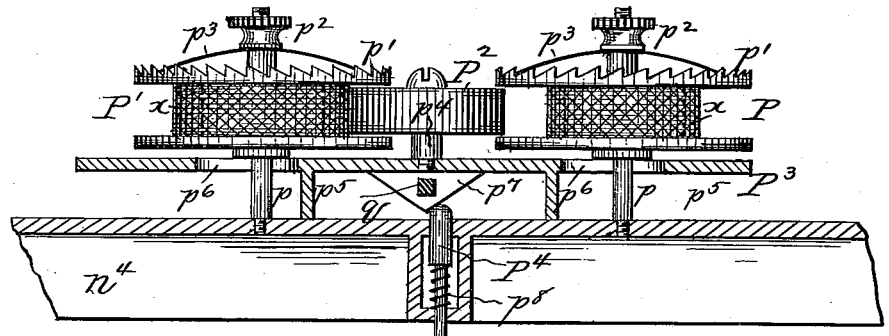
Figure 21:
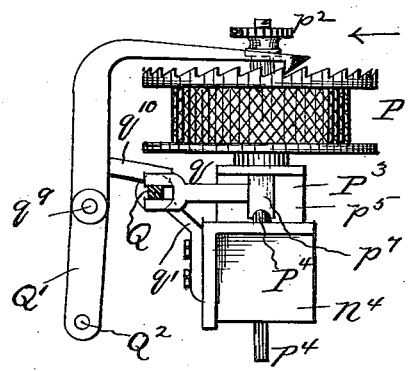
Figure 22:
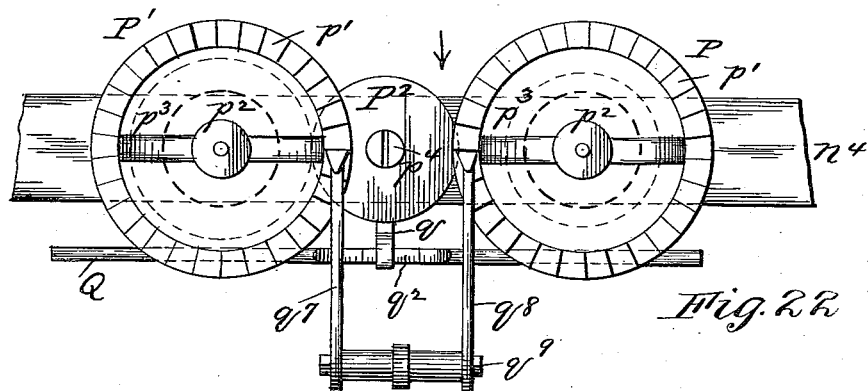
Figure 23:
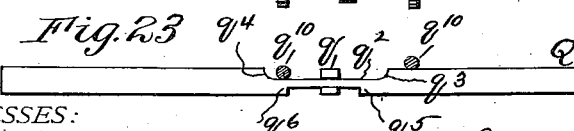
Figure 24:
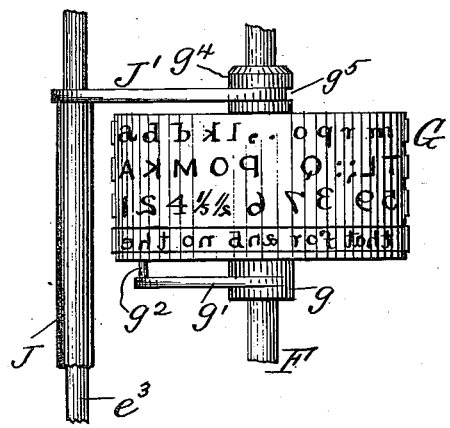
Figure 25:
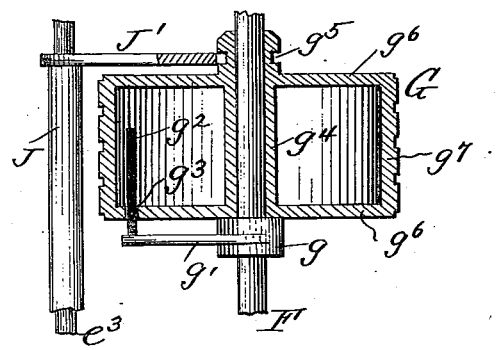
Figure 26:
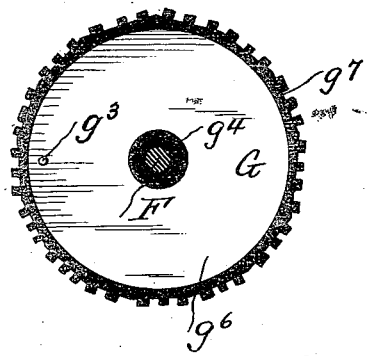
Figure 35:
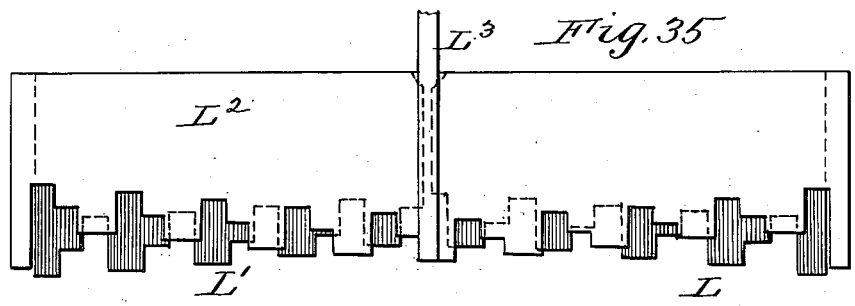
Figure 36:
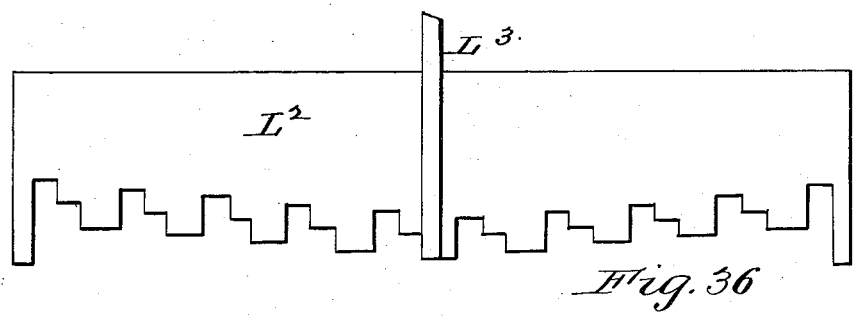
Figure 37:
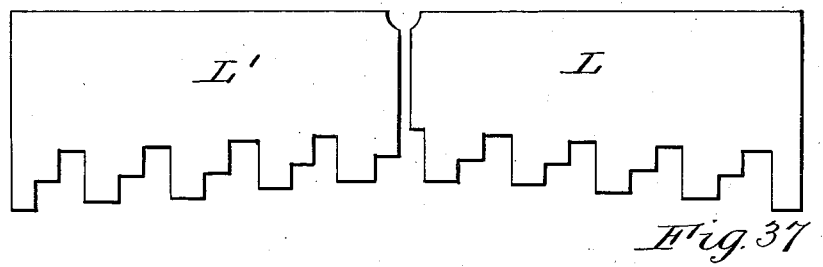
Figure 38:
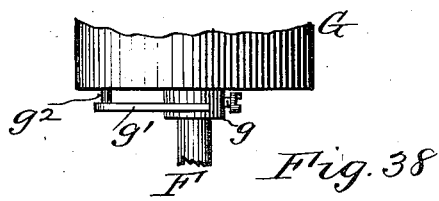
Figure 39:
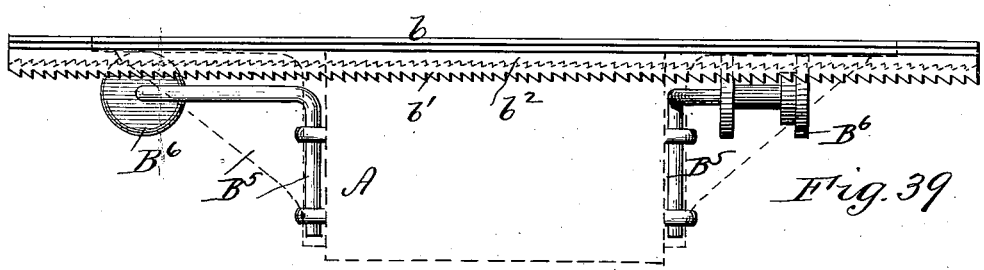
Figure 40:
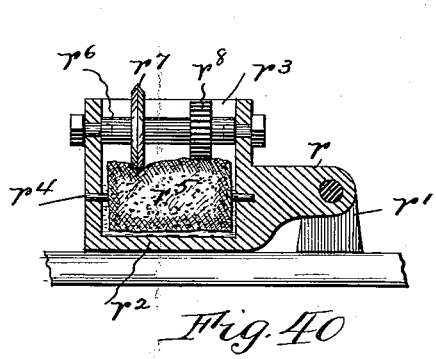
Figure 41:
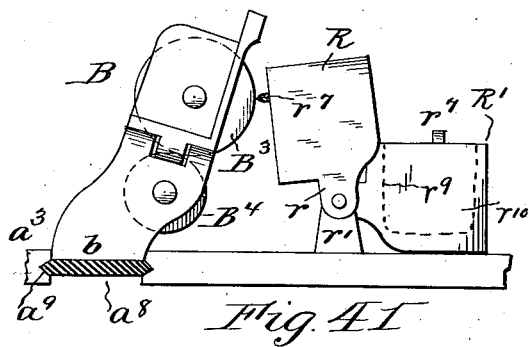
Figure 42:
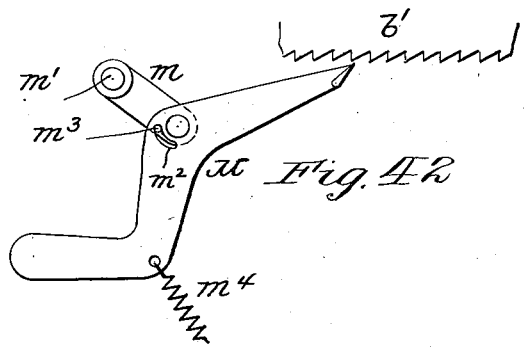
Figure 43:

Figure 1 is a top plan of a type-writing machine embodying my improvements. Fig. 2 is a like view, partly broken away and partly in section, with the paper-carriage removed from the machine. Fig. 3 is a like view with the top plate of the machine removed, partly sectional through the type-wheel frame and propelling-bar for oscillating said frame, and the paper-carriage partly broken away. Fig. 4 is a longitudinal section immediately adjacent to the left-hand side of the housing or side of the frame of the machine as represented in Figs. 1, 2, and 3. Figs. 5 and 6 are elevations from different points of view of a preferable form of keys for the key-levers of the machine. Fig. 7 is a sectional plan drawn to an enlarged scale, showing more plainly the construction and relative position of the type-wheel-tilting frame, shaft or support therefor, propelling mechanism for rotating the type-wheel, propelling mechanism for oscillating the type-wheel frame, spring-bar for returning said propelling mechanism to normal position, and part of the shifting mechanism for the type-wheel detached from the machine. Fig. 8 is an elevation of same, looking in direction of arrow 1, Fig. 7, and showing shifting mechanism for the type-wheel, as well as the latter itself in two positions. Fig. 9 is an elevation showing the segmental rack for propelling the type-wheel. Fig. 10 is an elevation showing cam segmental arm on type-wheel-supporting frame for controlling engagement and disengagement between the segmental racks and propelling-bails therefor. Fig. 11 is a perspective view showing actuating-pawl or feeding mechanism for moving the carriage to space for single letters or carriage-actuating mechanism therefor, and one form of stop-pawl for preventing any feeding movement of the carriage beyond that required for spacing the letter. Fig. 12 is an elevation showing a modified form of said stop-pawl mechanism for the carriage, also showing part of stop-rack for the carriage. Fig. 13 is an elevation, partly sectional, showing more plainly the feeding-pawl for the carriage, illustrated in Fig. 11, and showing said pawl in two positions with part of the carriage-feeding rack. Figs. 14 and 15 are elevations, partly in section, showing in two different positions the separate double-pawl feeding mechanism for the paper-carriage for variable spacing for words and other characters. Fig. 16 is an elevation, partly broken away, of the paper-carriage detached from the machine and the separable roller thereof in two different positions. Fig. 17 is an end view of the same, partly sectional, looking in the direction of arrow 2, Fig. 16. Fig. 18 is a like view with pawl-and-ratchet mechanism for imparting a rotary feed to the separable roller removed, and also showing spring pressure-fingers for said roller. Fig. 19 is a sectional elevation of the opposite end of the paper-carriage. Fig. 20 is an elevation, partly sectional, drawn to an enlarged scale, of inking-rollers, support therefor, and automatically-acting shifting device for changing the direction of feed of the inking-ribbon. Fig. 21 is a side elevation of same. Fig. 22 is a plan of same. Fig. 23 is a detail sectional view of shifting-bar for the actuating-pawls of the inking-ribbon spools. Fig. 24 is an elevation of type-wheel, shaft therefor, connection between the shaft and wheel, part of the shaft-carrying frame, and part of the shifting device for vertically moving the type-wheel to bring its different rows or fields of type into position. Fig. 25 is a sectional elevation of same. Fig. 26 is a horizontal section through the word row of the type-wheel. Fig. 27 is an elevation, partly sectional, of a modified form of paper-presser finger for the impression-roller of the paper-holder carriage. Fig. 28 is a sectional plan of locking device for the finger-key which actuates the type-wheel-shifting device to bring the row of caps into position for writing, so as to hold the wheel in such position while writing in upper case continuously. Fig. 29 is a sectional elevation of said key, locking device, frame-support, and reaction spring therefor. Fig. 30 is a sectional elevation, drawn to an enlarged scale, of finger-levers and the mechanism for controlling the word-spacing for the paper-carriage and finger-keys for shifting the wheel vertically. Figs. 31 and 32 are sectional plans showing in two different positions the type-wheel shaft, concentric ratchet, and fixed pawl therefor, illustrating, respectively, the manner in which said parts steady the position of the type-wheel and correct any inexactness in position of wheel for the letter to be printed or written. Fig. 33 is a sectional elevation showing more plainly the connection between the spacer-bar and the actuating mechanism for the separate double-pawl feeding mechanism for the paper-carriage to permit the last word of a letter and the space between said word and the following word to be made at one and the same time. Fig. 34 is an elevation showing the locking engagement of the type-wheel shaft, concentric ratchet and its fixed pawl, and engagement of the eccentric ratchet and propelling-frame for the type-wheel-shaft carrying frame at the terminal end of its oscillation in making an impression of a character on the platen or paper. Fig. 35 is an elevation of the propelling-bails for rotating the type-wheel and for propelling or oscillating the type-wheel-frame-carrying shaft. Fig. 36 is an elevation of the propelling-bail for oscillating the type-wheel-shaft-carrying frame. Fig. 37 is a like view of the bails for rotating the type-wheel shaft. Fig. 38 is an elevation of part of type-wheel shaft therefor and adjustable collar on said shaft for the type-wheel. Fig. 39 is an elevation of part of the machine-frame and paper-carriage, showing brackets on the machine-frame for additional support for extended lengths of paper-carriage, the bracket on the right being shown in its extended position and the one on the left being shown turned around out of engagement with the carriage-rack. Fig. 40 is a longitudinal vertical section of underscoring, canceling, and blank-space-filling device and support therefor, drawn to an enlarged scale. Fig. 41 is a side elevation of the same with paper-carriage partly in section, showing the underscoring device in position for action and the canceling device in its normal position, drawn to an enlarged scale. Fig. 42 is a similar view of the feeding-pawl shown in Fig. 13 and illustrating the same in its normal position disconnected from the paper-carriage-feeding rack; and Fig. 43 is a similar view of the feeding mechanism shown in Figs. 14 and 15, illustrating the same in normal position or disconnected from the paper-carriage-feeding rack.

A represents the frame of the machine, consisting of two sides $a\ a$, which are parallel for a portion of their length from the rear straight end $a'$ to approximately the transverse middle of the machine, from which line said sides diverge to their front ends $a^2\ a^2$, so that said sides are wider at their front than at their rear ends. The sides $a\ a$ from the end $a'$ of the frame to a transverse line 1 1 are of a lower height than from the line 1 1 to their front ends $a^2$ to provide a rear lower housing or part A' and an extended higher housing or part A², having, respectively, tops or covers $a^3$ and $a^4$, the latter of which is preferably attached to the sides $a\ a$, so as to be removable from the machine, and has an elongated opening $a^5$ from its rear end toward its front end, which opening in turn is closed by a raised removable cap A³, which, as shown in the drawings, has a pin connection $a^6$, with holes $a^7$, adjoining the edges of the opening $a^5$ in top $a^4$, as more plainly shown in Fig. 4.

In the top $a^3$ for the depressed part A' of the frame is a transverse wide slot or opening $a^8$, extending from side to side of the machine to their outer surfaces, so as to have open or free ends, and in the parallel edges of said slot $a^8$ and extending from end to end of the same are dovetail or other analogous ways or guides $a^9$ for the reception of a correspondingly-formed bottom plate $b$ of a paper-holding carriage B, which plate $b$, and consequently the carriage B, slides longitudinally to and fro in the open-end guideways $a^9$, and said depressed part A' of the housing forms the paper-carriage support.

C C represent the key-levers hung or pivoted upon a cross-rod $c$, (see Fig. 4,) which is suitably located as desired. The rear ends $c'$ of levers C are preferably in a common vertical and horizontal plane, and their front ends $c^2$ are suitably directed to the front end of the machine to form any desired number of banks or rows, three of which are shown in the drawings, and which extend beyond the other and are each provided with suitable keys $c^3$ to form a key-board located at the front end of the machine between the diverging ends $a^2\ a^2$ of the sides $a\ a$ of the frame A. The keys $c^3$ are preferably provided with lugs $c^4$, (see Figs. 5 and 6,) by means of which said keys are loosely pivoted, as indicated at $c^5$, to the front ends of the key-levers, so that said keys will move on their pivotal points to maintain their horizontal position as the ends $c^2$ of the key-levers move in an arc of a circle when finger-pressure is applied to depress them. If desired, the front ends of the key-levers may pass through suitable elongated guide-openings $a^{10}$ in the front cross end $a^{11}$ of the frame A, (see Fig. 4,) said end $a^{11}$ being inclined rearwardly from its bottom to its upper edge to conform to the banks or rows of key ends of the key-levers.

D represents a cross-shaft located beyond the rear end of the key-levers. This shaft may be a fixed shaft, but I prefer to so mount it in pin or knife-edge bearings that it is free to rotate. (See more plainly Fig. 7.) To it is secured the tilting type-wheel-shaft-carrying frame E, (see more plainly Figs. 7 and 8,) composed of a bottom bar $e$, located to the rear of the shaft and having end lugs $e'$ and a central lug $e^2$, through which shaft D passes. Projecting upwardly from the end lugs $e'$ are light side rods $e^3$, having shouldered screw-threaded upper ends $e^4$ $e^4$, connected by a cross-bar $e^5$ and held in place by nuts $e^6$ on ends $e^4$ $e^4$, so that said cross-bar is removable from the side rods $e^3$ of frame E.

F represents the type-wheel shaft suitably stepped at its lower end $f$ in the central lug $e^2$ of bottom bar $e$ of frame E and at its upper end by a screw $f'$, passing through an opening in the frame top bar $e^5$ and having a jam-nut $f^2$.

G represents the type-wheel, preferably loose on said shaft and supported thereon by a collar $g$, affixed to shaft F and having an arm $g'$, provided at its outer end with an upwardly-projecting guide-pin $g^2$, which enters an opening $g^3$ (see Fig. 25) in the type-wheel to connect it to shaft F, so as to rotate therewith, and also to admit of the type-wheel sliding up and down on said shaft, said guide-pin $g^2$ being long enough to maintain connection between it and the type-wheel as it is shifted or raised on the shaft. The collar $g$ may be adjustable on said shaft, as indicated in Fig. 38, to admit of adjusting the position of the type-wheel on the shaft.

The type-wheel G may be of any suitable construction and consist of any suitable material to obtain a light-weight rotating wheel of the requisite strength and durability for use as a hammer. To obtain these described functions, as well as others, I prefer to use a hollow hard-rubber wheel or cylinder having a shaft sleeve or bearing $g^4$, (see Figs. 24 to 26,) in the upper end of which are an annular groove $g^5$ and closed or solid top and bottom webs $g^6$ $g^6$, all of which, together with the letters or characters on its periphery $g^7$, are made in one piece by being cast or blown in a suitably-formed mold, as fully described in another pending application filed by me of an even date herewith, Serial No. 316,587.

There are preferably numerous rows or fields of letters or characters on the periphery of the wheel G, the upper one of which consists of lower-case and the most used punctuation-marks; the second row or field consisting of capitals or upper-case, and, if desired, other punctuation-marks; the third row of numbers, fractions, or other desired characters and punctuation-marks of least frequent use, and the fourth row of one, two, three, four, or more letter words. The periphery of the wheel for the word row or field is made up of a series of tangential surfaces or lines corresponding to chords of segments of circles as contradistinguished from a continuous circular line or surface to provide flat surfaces for the word-types in order to present them square or parallel from end to end to the paper and make a distinct or even impression of the entire word. The number of such flat surfaces corresponds to the number of word-types, and the length of each flat surface differs according to the number of letters in the word. The periphery of the wheel for the rows of single letters or characters is circular, as is usual. If desired, the number of rows or fields and the characters or type in each row may be varied.

As above stated, I prefer to use a wheel constructed and arranged as above described, as its range or scope of work is large and speed of writing materially increased.

Upon the type-wheel shaft F below collar $g$ is secured a locking and steadying ratchet for the type-wheel and its shaft, which is shown in the drawings as a concentric ratchet-wheel H, having deep recesses $h$ between the teeth, the inner parts of which recesses have parallel sides, as indicated at $h'$, which diverge at their outer or peripheral ends $h^2$, as shown more plainly in Figs. 31 and 32. There are as many recesses in the ratchet-wheel H as there are letters or characters in any one of the single letter or character rows or fields on the type-wheel; or, in other words, each recess $h$ on the ratchet H is representative of a letter or type in any one of the single letter or character rows on the type-wheel, and the latter and the ratchet-wheel H move or rotate coincidently, and certain ones of the recesses in ratchet-wheel H will also be representative of the word-types in the word row or field on the type-wheel.

Below the concentric ratchet-wheel H, and connected to it, if desired, by a bar $h^3$ for steadying and supporting it, (see Fig. 34,) is a stopping-ratchet H', having two rows of peripheral or otherwise suitably-located teeth or projections, one on each side of a zero or central point. These teeth are so arranged as to move in different concentric paths and coincidently with the concentric ratchet-wheel H and type-wheel G, and each tooth or projection on the ratchet H' is representative of a letter or character in any of the single letter or character rows, and certain teeth thereof are also representative of the word-type in the word-row the same as the concentric ratchet-wheel H. Below the ratchet H' a miter or other suitable gear-wheel H² is so placed relative to and in such connection with the wheel H' as to operate the same.

Upon one of the side bars $e^3$ of the type-wheel-shaft-carrying frame E is a loose sliding sleeve J, having at its upper end an arm J' the outer free end of which is bifurcated and loosely engages with the annular recess $g^5$ in the upper part of the axial sleeve or hub $g^4$ of the type-wheel, so as not to interfere with its rotary movement, and by means of which the type-wheel is raised or lowered, as hereinafter described, to bring the different fields or rows into position for action.

On the rear side of the bottom bar $e$ of the type-wheel-shaft-carrying frame E is a lug $e^7$, supporting a rod $J^2$, which runs parallel with shaft D, and upon said rod $J^2$ is hung a sliding yoke $J^3$, the end $J^4$ of which is also hung or slides on the shaft D, and between said end $J^4$ and the lug $e^7$ and surrounding the rod $J^2$ is a spiral spring $J^5$, the retractive force of which returns yoke $J^3$ to its normal position after it has been moved. The end $J^4$ of yoke $J^3$ has a link connection $J^6$ with the lower end or other part of sleeve J on the type-wheel-carrying frame E, and is also in line or has a loose engagement with a depending finger $k$, secured to a rock-shaft K, running lengthwise of and journaled in suitable bearings in the frame of the machine. By actuating rock-shaft K, as hereinafter described, its finger $k$ contacts with the end $J^4$ of yoke $J^3$ to slide it in the direction of arrow 3, Fig. 8, to cause its link connection $J^6$ to raise or vertically shift sleeve J, and in turn the type-wheel G, as indicated by dotted lines to the right of Fig. 8, and the reaction of the spring $J^5$ reversely moves said yoke-frame to lower said sleeve J and type-wheel G on its shaft and also to return the rock-shaft K to its normal position.

Upon each side of the gear-wheel $H^2$ on the type-wheel shaft F and meshing with said gear are segmental racks I and I'. These racks are located at right angles to shaft D and are loosely mounted thereon by lower end sleeve $i$. The stems of these racks are provided with forwardly-projecting concentric arms $i'$, (see Fig. 9,) having at their free ends on one of their sides edge flanges or projections $i^3$, from which lead lateral openings $i^2$. On shaft D are also suitably hung the right and left propelling-bail frames L L', each of which at its approaching end is provided with a sliding pin $l$, mounted in bearings $l'$ $l'$ on the bails, and each pin $l$ has a collar $l^2$, between which and the inner bearing $l'$ for the pin and surrounding the latter is a spiral spring $l^3$. These pins $l$ are so located relatively to the arms $i'$ of the segmental racks I I' that when the bails or frames L L' and the segmental racks I I' are in their normal positions, as indicated to the left in Fig. 7, the inner or approaching ends of the pins $l$ abut against the edge flanges $i^3$ on the rack-arms $i'$, and the opposite ends of said pins are in line with the outer or free ends of curved fingers $l^4$, preferably concentric with the axis of shaft D and secured to the frame E or to said shaft D, as desired. (See Fig. 10.) The outer or free ends of fingers $l^4$ on their sides adjacent to the pins are cut away or inclined to form cams $l^5$. When the bails L L' and segmental racks I I' are in their normal position, as above noted, the cam ends $l^5$ of fingers $l^4$ are opposite or adjacent to the outer ends of the pins $l$, so that the latter can be receded or moved under the action of springs $l^3$ out of engagement with the segmental rack-arms $i'$ and normally leave the segmental racks free from or out of engagement with said pins $l$. A movement of any one of the bails L L' by a depression of a key-lever carries with it the pin $l$ thereon, and it moves off the inclined or cam end $l^5$ of the respective finger $l^4$ therefor onto the straight part of said finger, which movement slides the pin $l$ into the opening $i^2$ of one of the segmental racks to engage the same, as indicated to the right of Fig. 7, in order that the moving bail may act to oscillate the segmental rack for rotating the type-wheel shaft F in one direction. A like movement of the other bail produces a similar movement of its pin $l$ to engage the other segmental rack for rotating the type-shaft in the opposite direction. During all the time that either of the segmental racks is propelled or oscillated the bail-pin $l$ on the moving bail is kept in engagement with the engaged rack-arm $i'$ by reason of the outer end of the pin $l$ being in contact with the straight part of finger $l^4$, provided therefor. Upon the return movement of the racks, when they arrive at their normal position, the reaction of the pin-springs $l^3$ reversely slide the pins out of the rack-arm openings $i^2$, when the pins arrive opposite to the cam ends $l^5$ of the fingers $l^4$ to admit of such movement.

From the foregoing it will be noted that each segmental rack is normally out of engagement with or disconnected from its propelling mechanism and is only placed in engagement with such mechanism when a key-lever is depressed, and that when one of said racks is propelled in one direction to oscillate the type-wheel shaft the other rack reversely moves and is at liberty to do so by reason of being free from its propelling mechanism, and neither rack interferes with the free movement of the other in rotating the type-wheel. As said segmental racks in returning to their normal position again change the direction of their movement to reverse the rotation of the type-wheel to bring it back to its normal position, it is essential to prevent rebounding or extra oscillations of the racks and of the type-wheel when they arrive at normal position. To this end the flanged edges $i^3$ on the rack-arms $i'$ are provided, so that when said racks return to their normal position the flanged edge $i^3$ of one or the other of the racks meets the pin $l$ for said rack and stops or checks any further movement or rebounding of the rack and in turn of the type-wheel, so that it is fully stopped the instant it returns to its normal position and correspondingly responds to the movements of successive key-levers to obtain distinct and rapid writing. The racks I I' are normally in contact with a spring-actuated presser bar or bail I², loosely mounted on shaft D, so as to move concentrically with the racks for returning them and in turn the type-wheel shaft and propelling-bails L L' to their normal position after being moved by a depression of a key-lever C. The retraction-spring I³ for said bail I² is secured at one end to the bail and at the other to the shaft D, (see more plainly Fig. 7,) and as one or the other of the racks is propelled it moves ahead of it the pressure bar or bail, so that the latter is always in contact with one or the other of the racks as it is moved to rotate the type-wheel shaft in order to be ready to act upon either of the racks to return the same and the type-wheel to normal position.

L² represents the single locking-bail for engagement with the eccentric ratchet H' and for propelling the tilting frame E with type-wheel G and shaft F to the paper-carriage B, so that the type-wheel may strike the paper or pad to make the impression. Said bail L² is hung upon the shaft D in front of the bails L L' (see Fig. 7) and has, if desired, an upwardly-projecting finger or extension L³ in line with the central or zero point of the eccentric ratchet H'. This bail L² has a graduated movement inversely proportional to the movement of the eccentric ratchet-wheel H' for engaging any one of the teeth of said ratchet at the proper time for stopping the rotation of the type-wheel shaft and for maintaining such locking connection, in order to also act as a propelling-bail for tilting frame E with type-wheel G and its shaft to cause the type-wheel to act as a hammer for making the impression.

The bails L, L', and L² are provided with flanges the lower edges of which are inclined and graduated or stepped, as desired, there being a representative step or graduation on the bails L and L' and on the bail L² for each letter of any one of the single character or letter rows and certain ones of said graduations being representative of the words in the word-row on the type-wheel, the same as above described, for the concentric and eccentric ratchet-wheels H and H', respectively. The flange of the bail L² is in front of and extends across both flanges of the bails L L', and the stepped or graduated edge of the flange of bail L² has reverse inclinations, and they may be arranged relatively to the inclinations of the graduated or stepped edges of the flanges of bails L L', as shown in Fig. 8, or as shown in Figs. 35 to 37, inclusive, or as illustrated in said other pending application, Serial No. 316,588. The stepped edge of the flanges of the bails L, L', and L² normally rest or are in position on the rear ends c' of the key-levers C. As the graduated or stepped flange of the bail L² extends across both flanges of the bails L L', a movement of any key-lever C to actuate either of the bails L L' also actuates the bail L². As the type-wheel only makes a half of a revolution in either direction from a central or zero point, it follows that a smaller movement or traverse of the type-wheel is required to position a letter adjacent to the center or zero point than that required for one that is farther away from said point, and that such traverse or movement increases from the central or zero point to the opposite end of each half of the type-wheel, and vice versa, and that to effect such variation of movement of the type-wheel the flanges of the bails L and L' are stepped or graduated in different directions, the key-levers engaging with the one part or graduations of said flanges to produce a limited movement or oscillation of said bails L L' and effect a small traverse of the type-wheel shaft for positioning the letters nearest to the central or zero line, and the key-levers engaging with the other parts or graduations of said flanges to produce a greater movement of said bails L L' and a corresponding traverse of the type-wheel shaft for positioning the letters farthest away from said central point; and as the representative teeth on the ratchet H' are correspondingly located and have corresponding movements it follows that the smaller the traverse of the type-wheel the smaller the movement of the ratchet-wheel, and reversely. Accordingly as the variation of traverse of the ratchet-wheel H' is effected the movement of the bail L² also varies, but in reverse ratio, in order that the bail or its extension L³ may engage with the proper tooth of the eccentric ratchet H' at the proper time under all variations of movement thereof to lock the type-wheel and shaft to position the desired letter or character to be struck or impressed—that is to say, when the type-wheel, its shaft, and the ratchet have greater traverse the bail L² has its smaller movement and reversely; and it is for this reason that the inclines or steps on the flange of bail L² are oppositely directed to the respective or adjacent inclines on the flanges of the bails L L'. When a key-lever C is depressed, which represents a letter which is so located on any of the fields or rows on the type-wheel that it must move its full traverse in order to position the type to be struck, the lever of such key will be so located that its inner end will impinge upon that one of the steps or graduations of the flange E of either of the bails L L' that will admit of the greatest movement of either of said bails L or L' and will also impinge upon that one of the graduations or steps in the flange of bail L² that will admit of its smallest movement, so that the initial movement or traverse of said key-lever will first move or tilt either bail L or L' to bring its pin l into engagement with its respective segmental rack I or I' for rotating the type-wheel shaft, the type-wheel, the ratchet, and the concentric ratchet-wheel thereon to nearly their full movement or traverse before said key-lever comes into contact with the flange of bail L² to oscillate it to bring its extension L³ into engagement with the last tooth of either half of the ratchet H' or that tooth farthest from its central point. As the type-wheel and the ratchet and the concentric ratchet-wheel will, however, then have been revolved almost far enough, the further slight movement of the bails L, L', and L² together brings the type-wheel and ratchet and the concentric ratchet-wheel to the full limit of their traverse at a time when the extension L³ of bail L² is ready to engage with the representative tooth on said ratchet H'. As soon as the bail L² engages with the ratchet H' (see Fig. 34) the shaft F and type-wheel G are locked against further rotation and either one of the bails L or L', together with bail L², are in such position that a continuation of their pivotal movement by further depression of said key-lever also effects a tilting or pivotal movement of the type-wheel-carrying shaft-frame E to advance or throw the type-wheel against the paper or platen, and hence bail L² also serves as a propelling-bail for the tilting frame E. If in place of the above-named key-lever being depressed it should be a key which represents a letter or character on any one of the type-wheel rows near to its central or zero-point that only a slight movement of the type-wheel and shaft is required to position such letter, then in such case the key-lever depressed will be located to first strike the graduation on the flange of bail L² to first move it until its extension L³ is nearly in engagement with the ratchet H', at which time said key-lever will contact with a corresponding graduation on the flange of one of the bails L or L' to move one of them the slight distance required to effect a corresponding rotation of the type-wheel shaft to position the letter or character of any one of the fields or rows on the type-wheel and its representative tooth on the eccentric and the concentric ratchet-wheel; but as the bail-extension L³, having previously been brought up close to the ratchet H', is in position to engage with it as soon as such slight rotation of the type-wheel is effected and said parts are locked against further rotation, and a continuation of the movement of bail L² propels the type-wheel forward to the platen or paper to make the impression, as before described, a depression of any key-lever therefore first actuates one of the bails L or L' and bail L² to either first rotate the type-wheel shaft with type-wheel and the concentric and eccentric ratchet-wheel H and H' to position a letter or character, and also to lock said shaft against further rotary movement, or to first move the bail L² and then rotate the shaft for a like purpose, and finally to throw or carry the type-wheel to the impression pad or roller. At the terminal end of the movement of the type-wheel shaft and the concentric ratchet-wheel H to the impression pad or roller the representative recess of said ratchet-wheel comes into alignment, as indicated in Figs. 31 or 32, with a fixed finger $h^4$, secured to the frame of the machine, or to a curved bar $h^5$, attached to the top of the carriage support or bed A', and if said finger $h^4$ and ratchet-wheel recess $h$ are in exact alignment, as shown in Fig. 31, the finger passes through the flaring part directly into the straight part of the recess $h$ of wheel H to further lock and steady the type-wheel shaft and type-wheel as it advances to make the impression. (See Fig. 34.) If from any cause—as, for instance, wear of the teeth of the ratchet H', or of the graduations of the bails L L' L², or of other parts, or of want of accuracy of adjustment of said parts, or of cutting of the teeth of the ratchet H'—the rotation of the type-wheel does not precisely position the letter nor the representative tooth on the concentric ratchet-wheel H, so that it is not in exact alignment with the finger $h^4$ when approaching the same, the latter will strike one of the sides of the flaring part $h^5$ of the recess $h$, as indicated in Fig. 32, and will as it enters into the recess slightly rotate the ratchet-wheel H, and in turn the shaft and type-wheel to take up such wear or want of precise adjustment and to exactly position the letter before it is struck. Said finger $h^4$ and ratchet-wheel H therefore subserve two purposes—first, to further lock the type-wheel in position and steady it as it strikes or makes the impression, and, second, to correct or compensate for any want of exact position of a letter or character on the type-wheel. This last-named result is admissible for the reason that the ratchet H' and its locking-bail L² have already acted to fix the position of the letter, and by using said fixed finger $h^4$ and ratchet H, undue care need not be taken in cutting the teeth of the ratchet nor in cutting or forming the graduations on the bails L L' L², nor in adjusting said parts in the machine, which results in an economy of manufacture and of interchangeableness of said parts for repairs or replacement.

In front of the propelling-bail L² is a pivoted bail N, hung to the sides of the frame of the machine, and has along its length a number of graduated stops or screws $n$, one for and in line with each key-lever C. (See Fig. 4.) This bail N has a link connection $n'$ with a lever $n^2$, pivoted at its end $n^3$ to a cross-bar $n^4$, secured to the sides of the machine above the key-levers. The other end of lever $n^2$ has a catch $n^5$, which engages with a pin or lug $n^6$ on one of the side bars $e^3$ of the frame E to normally lock it in position and while the type-wheel is being rotated to position a letter or character. As soon as this is done the end $c'$ of the key-lever C actuated comes into contact with graduated screw $n$ on bail N for said key-lever C and raises the bail N, and in turn through the medium of link $n'$ the lever $n^2$ for releasing its catch end $n^5$ from the frame lug $n^6$ to free said frame E at a time when the propelling mechanism L² therefor comes into action. The type-wheel, therefore, cannot be moved toward the impression-pad until rotated to position the letter or character to be struck.

The graduated stops or screws $n$ on said bail N are provided to admit of a graduation for each key-lever C, so that when any one of them is depressed or moved it will effect a rotation of the type-wheel before the key-lever strikes its respective pin $n$ on the bail N to move the same to release the lever $n^2$ from the frame E.

Any suitable fixed stop, as indicated by dotted lines N', Fig. 2, may be used for limiting the return movement of the frame E.

P P' represent a pair of inking reels or spools, which are loosely mounted on fixed shafts $p$ $p$ on cross-bar $n^4$, (see more plainly Figs. 20 to 23, inclusive,) and said spools are provided with suitable ratchet-wheels $p'$. At the top of the shafts $p$ $p$ are thumb-nuts $p^2$ for tensioning plate or other springs $p^3$, mounted on shafts $p$, and the free ends of which exert a downward pressure upon the top of the reels or spools to cause them to retain their seats and not revolve faster than is necessary for a proper operation of the parts. Between the spools P P', so as to enter between their ends and contact with the outer coils of ribbon $x$ on any one of the spools, is a roller or wheel or other bearing-surface P², which is journaled on a shaft $p^4$, secured to a sliding plate P³. This plate has a gradual sliding movement imparted to it alternately backward and forward by the corresponding movement of the wheel P² under the influence of the gradual filling or coiling of the ribbon on alternate spools. This plate P³, as is shown in the drawings, has legs $p^5$ mounted upon the cross-bar $n^4$, and is provided with elongated slots $p^6$, through which the spool-shafts $p$ pass, so that plate P³ can longitudinally slide back and forth without interference from the spool-shafts, which, it will be seen, serve also as guides for said plate P³.

On the under side of plate P³ is a double or reverse wedge-shaped projection or cam $p^7$, having its reversely-inclined faces sloping toward the spools. One of these faces is always in contact with a spring-actuated pin P⁴, which, as shown, has an outward or upward spring-pressure contact with the faces of the wedge $p^7$. The pin P⁴ acts to steady said gradual movement of plate P³ and wheel P². When the apex of the wedge $p^7$ passes the pin P⁴, so that it contacts with the opposite side of the wedge $p^7$, the upward pressure of spring $p^8$ for pin P⁴ acts to push it up against said opposite side of the wedge and imparts a quick sliding movement to plate P³ to throw the wheel P² out of contact with a full spool and into contact with the last coil of ribbon on the other or empty spool, which then becomes the winding-spool, so that the winding or coiling of the ribbon on a spool gradually moves the wheel P² and plate P³ toward the spool from which the ribbon is unwinding, and when said winding-spool is full the spring-pin P⁴ is then in position to quickly complete the movement of plate P³ or throw it and the wheel P² toward the unwinding-spool or to the last coil of ribbon thereon, which spool in turn then becomes the winding-spool for moving said plate and wheel in an opposite direction to get into position ready to be thrown over to said first-named spool by the pin P⁴ when the winding-spool is full. The wedge $p^7$ carries an arm $q$, which at its outer end embraces a bar Q, sliding in suitable bearings $q'$, secured to cross-bar $n^4$, and has a depression $q^2$, with upward-inclined ends $q^3$ $q^4$ and shoulders or lugs $q^5$ $q^6$ on each side of arm $q$ and located at some distance apart. The arm $q$ moves with plate P³ and reciprocates bar Q correspondingly with the like quick movements of plate P³ by alternately acting upon the shoulders or projections $q^5$ $q^6$ on bar Q. The movement of the latter only occurs when the spring-pin P⁴ comes into action to throw the plate P³, and it is for this reason that the shoulders $q^5$ $q^6$ on bar Q are wide apart, as they permit the arm $q$ to have the gradual movement of plate P³ independent of bar Q. Such gradual movement of arm $q$ in one direction brings it toward one of the shoulders $q^5$ $q^6$, so that when pin P⁴ acts to quickly throw the plate P³ the arm $q$ strikes against one of the shoulders $q^5$ $q^6$ to simultaneously move bar Q with the quick throw of plate P³.

$q^7$ $q^8$ represent actuating-pawls for the spools P' P, respectively, only one of which pawls is in action at a time, and when thrown or oscillated in the direction of the arrow in Figs. 21 and 22 they intermittently rotate the spools in opposite directions. Said pawls are located on adjacent opposite sides of the spools to impart reverse rotations thereto. The pawls are mounted or pivoted at $q^9$ upon a rocker-arm Q', secured to a cross-shaft Q², having its bearings in the frame A, and which, as shown, is located immediately above and parallel with the shaft $c$ for the key-levers C.

To shaft Q² is secured a bail Q³, which rests upon all the key-levers C, as shown more plainly in Figs. 3 and 4, so that a movement or depression in any one of the key-levers will raise bail Q³ to actuate the rocker-arm Q' for operating the pawls $q^7$ $q^8$ to intermittently rotate one or the other of the spools. The pawls $q^7$ $q^8$, when free to do so, have a gravity contact with the ratchet-wheels $p'$ of the spools in order to rise and slip over the teeth of said ratchet-wheels when making a return movement to get into engagement position therewith. Each of these pawls has an arm or finger $q^{10}$ so located that whenever a pawl is in action its finger $q^{10}$ is in and contacts with the depression $q^2$ of bar Q, and when not in action the finger $q^{10}$ is in contact with the upper side of bar Q, being brought there by the adjacent inclined end $q^3$ or $q^4$ of the depression $q^2$ when the bar is shifted. Such movement raises the pawl out of action with its respective spool-ratchet, so that when bar Q is shifted by the arm $q$ one of the pawl-fingers $q^{10}$ falls into the depression $q^2$ of bar Q to permit the pawl to which said finger is attached to drop into engagement with an empty spool and actuate it to wind up the ribbon and change the direction of its feed, while on the other hand the finger $q^{10}$ of the remaining pawl rides up on one of the inclines $q^3$ or $q^4$ to the top of bar Q to raise said pawl out of engagement with its respective spool-ratchet, which spool having been the winding-spool is filled with the ribbon and now becomes the unwinding-spool. The spool P' being the winding-spool, its pawl $q^7$ is in action, while that for the spool P is not, its finger $q^{10}$ being then upon the top of bar Q, as indicated to the right of Figs. 22 and 23. A depression of a key-lever C raises bail $Q^3$ to rock shaft $Q^2$ and rocker-arm Q' to move the pawl $q^7$ into position one or more teeth ahead on the spool-ratchet $p'$, and when pressure is released from the key-lever C and it and the rocker-arm Q' return to their normal positions the reverse movement of said rocker-arm correspondingly moves the pawl $q^7$ to impart an intermittent motion to the spool for winding the ribbon thereon to feed it in one direction, the feed of the ribbon taking place just before the letter is struck. As the inking-ribbon is gradually wound upon the spool P', the successive coils gradually slide the wheel $P^2$ and plate $P^3$ toward spool P and the spring-pin $P^4$ travels down the inclined face of the wedge $p^7$, with which it is in contact, to steady the gradual movement of said wheel. When the spool P' is full, the apex of the wedge has passed the spring-pin $P^4$ and the arm $q$ is adjacent to the shoulder $q^5$ on bar Q. The pin $P^4$ then acts to quickly throw plate $P^3$ to move the wheel $P^2$ into contact with the hub or last coil of ribbon on spool P, and at the same time the arm $q$ strikes the shoulder $q^5$ of bar Q and correspondingly throws it along with the plate $P^3$, whereupon the inclined end $q^4$ of depression $q^2$ on bar Q raises finger $q^{10}$ of pawl $q^7$ to the top of bar Q for elevating or moving said pawl $q^7$ out of engagement with the spool P', and the finger $q^{10}$ of pawl $q^8$ drops into the depression $q^2$ of bar Q to lower said pawl into engagement with the ratchet $p'$ of spool P to rotate it for changing the direction of the feed of the inking-ribbon. The spool P then becomes the winding-spool, and it reverses the direction of the gradual sliding movement of wheel $P^2$ and plate $P^3$ toward the unwinding-spool P', so as to get into position to be again quickly actuated by spring-pin $P^4$ when spool P is filled. This automatic change in the direction of the feed of the inking-ribbon goes on continuously and needs no attention of the operator, and the machine is writing legibly at all times. The inking-ribbon $x$ as it comes from the spools P P' is conducted by suitably-fixed guide-pins $x'$ outside of the type-wheel G and its shaft-carrying frame E to and through angularly or other suitably shaped slits $x^2$ in the top of fixed posts $x^3$ on the top of the machine, so as to pass transversely between the type-wheel G and the paper carriage B, as more plainly shown in Figs. 2 and 4. No part of the inking-ribbon is carried on the type-wheel-shaft-carrying frame E, and as the feed of the ribbon is effected on the forward movement of the type-wheel the ribbon between the type-wheel and carriage B is always sufficiently yielding to move with the type-wheel to the impression-pad, such movement of the inking-ribbon drawing it taut as the impression is made to avoid blurring the impression.

Upon the paper-carriage bottom plate $b$ (see more plainly Figs. 16 to 19) are upright standards or supports B' $B^2$ for the paper-carrying rollers $B^3$ $B^4$. The bottom plate $b$ is considerably longer than the machine is wide, as shown more plainly in Fig. 1, and has a suitably formed and arranged rack for feeding and checking device or devices. In the drawings the rack is shown in two parts $b^x$ and $b^2$, one for the feeding and the other for the checking pawl, and are separate from and parallel to each other and have their teeth pointing in opposite directions.

The rollers $B^3$ and $B^4$ may be journaled in the standards B' and $B^2$, as desired; but I prefer to so mount the upper roller $B^3$ as to be separable from the roller $B^4$ to facilitate the insertion of the paper, especially when manifolding between the rollers. To this end I make the standard $B^2$ in sections, the upper section $b^3$ being pivoted or hinged to the lower section, as indicated at $b^4$, and in this pivoted section is journaled the end $b^5$ of shaft of roller $B^3$. The opposite end $b^7$ of said shaft is journaled in an elongated slot $b^8$, having an open upper end in standard B', said shaft end $b^7$ being held to its bearing by a pawl $b^9$, suitably pivoted to standard B', and having a spring $b^{10}$, which acts to impart to pawl $b^9$ a downward pressure upon the shaft end $b^7$. By providing the pawl $b^9$ with a suitable handle or lug $b^{11}$, by means of which it can be manually disengaged from shaft end $b^7$, the roller $B^3$ can be raised or swung on the pivotal connection of section $b^3$ of standard $B^2$ to separate it from roller $B^4$, as indicated by dotted lines $y$, Fig. 16, for ready insertion of the paper between the rollers $B^3$ and $B^4$, which is especially advantageous when manifolding a number of sheets or copies, as the latter can be instantly inserted between the rollers without liability of slipping upon each other. Upon the end $b^5$ of the shaft of roller $B^3$ and at its outer extremity is a knob or handle $b^6$ for manually turning the roller $B^3$ in either direction, as desired. Back of said knob or handle is a ratchet-wheel $b^{12}$, having a check spring-pawl $b^{13}$, secured to standard-section $b^3$, and a feeding-pawl $b^{14}$, pivoted to a lever $b^{15}$, loosely mounted on roller-shaft end $b^5$. Said pawl is provided with a handle or lug $b^{15}$ for manually engaging said pawl with the ratchet-wheel $b^{12}$ for rotating the roller $B^3$ in order to feed the paper for spacing the lines of printing or writing. Said pawl $b^{14}$ is so pivoted that it is normally out of engagement with the ratchet-wheel $b^{12}$, as more plainly indicated in Fig. 17, so that it will not interfere with the rotation of the roller $B^3$ when a movement of knob or handle $b^6$ is made. The lever $b^{15}$ has at its upper end a screw $b^{17}$, the end $b^{18}$ of which abuts against the standard-section extension $b^{19}$, being maintained normally in such impingement by a spring $b^{20}$, acting against a toe $b^{21}$ at the lower end of said lever. (See more plainly Fig. 18.) The screw $b^{17}$ limits the movement or adjustment of lever $b^{15}$ in one direction and its toe $b^{21}$ in the opposite direction. By adjusting the screw $b^{17}$ the extent of movement of the lever $b^{15}$ is varied to correspondingly vary the extent of movement of pawl $b^{14}$ and in turn the rotation of the ratchet-wheel $b^{12}$ to increase or decrease the turning movement of roller $B^3$ and the spacing of the paper between the lines.

To rotate roller $B^3$ by pawl $b^{14}$, the operator presses against knob or handle $b^{16}$, the first movement of which engages the pawl $b^{14}$ with the ratchet-wheel $b^{12}$, after which the lever $b^{15}$ and pawl $b^{14}$ move together to rotate the ratchet-wheel $b^{12}$ and in turn the roller $B^3$, the terminal movement of said parts being limited by the lever-toe $b^{21}$ abutting against a shoulder or ledge on standard-section $b^3$. As soon as the pressure is released from the pawl $b^{14}$ the reaction of spring $b^{20}$ returns the lever $b^{15}$ and pawl $b^{14}$ to their normal positions. When in this position, the pawl $b^{14}$ is free from the ratchet-wheel $b^{12}$, and by then turning the knob or handle $b^6$ on shaft of the roller $B^3$ it can be rotated in either direction to any desired extent, as desired, independent of its feeding movement for spacing between the lines, such independent rotation being especially desirable for underscoring, canceling, and other like purposes, as hereinafter described. A further advantage of this construction is that if it be desired to impress a character or word in place of one already printed at any place on the paper on the platen or upon a sheet that has been removed from the platen, or to make any other correction, the particular place upon said sheet can be brought to the point necessary for the type to act upon to make the change desired. In other words, if it be desired to reposition the sheet to insert an intermediate line, to correct a word or character, or to reimpress the same letter, all that is necessary is to turn the free roller in either direction until the desired line is reached and then move the carriage until the desired point is reached. By using a freely-sliding carriage the point could be reached on a diagonal line by sliding the carriage and turning the roller at the same time.

In using the ruling device, hereinafter described, diagonal lines could also be made by moving the carriage and roller in the manner described.

It will be noted that the type-wheel is vibrated in a fixed plane, so that every type thereon, when positioned to be impressed, is moved in identically the same plane toward and against the platen, which is moved laterally across this plane whenever a type-key lever or the spacer-bar is depressed.

It will be noted that as the two separate rotary feeding mechanisms for the roller $B^3$ are located or mounted on its shaft and standard-section $b^3$ all of said parts move with the roller $B^3$ when it is raised or separated from roller $B^4$.

The rack $b'$ of the carriage B is the feed-rack, and its actuating-pawl M is loosely mounted upon a crank-arm $m$, secured to a rocker-shaft $m'$, running lengthwise of the machine and having its end bearings in the cross-bar $n^4$ and the rear end of the machine. (See more plainly Figs. 3 and 13.)

The pawl M is provided with a segmental slot $m^2$, concentric with its pivoted support on crank-arm $m$, into which slot projects a pin $m^3$, secured to said crank-arm $m$. (See more plainly Figs. 11 and 13.) This pin $m^3$ and slot $m^2$ limit the radial movement of the pawl M on its pivotal point when moved in one direction by the rocker-shaft $m'$ and crank-arm $m$, and in the other or its return movement by the spring $m^4$, secured at one end to the tail-piece of the pawl and at the other end to the frame of the said machine. The shaft $m'$ is rocked to produce the feeding movement of the pawl M for the carriage B by a finger $m^5$, attached to bail $Q^3$, which finger engages with a wiper or arm $m^6$ on rocker-shaft $m'$, as more plainly shown in Fig. 11. The pawl M is normally out of contact with the carriage-rack $b'$, (see more plainly Fig. 42,) and is only in engagement therewith when a key-lever C is depressed. Upon rocker-shaft $m'$ is another pawl M', which may be rigidly secured to said shaft so as to oscillate therewith, as indicated in Fig. 11, for engaging with the carriage-rack $b^2$ to check its feed or prevent undue feeding movement of the carriage by the pawl M. I prefer, however, to secure the checking-pawl M' to a spring-arm $m^7$, secured to the machine, as more plainly illustrated in Figs. 2 and 12, especially the latter, and provide the rocker-shaft $m'$ with a presser-arm $m^8$ for raising the pawl M', which is normally out of engagement, into engagement with the carriage-rack $b^2$ at the proper time, which is at the end of the feeding movement of the pawl M. The check-pawl M' is also normally out of engagement with the carriage-rack $b^2$, as indicated in full lines, Fig. 12, and is in engagement therewith when a key-lever C is depressed.

The pawl M feeds the carriage to space for each single letter or character struck only, and this is done by any one of the key-levers C, which as it is depressed elevates the bail $Q^3$ and its finger $m^5$. As the latter rises it, through the medium of wiper $m^6$, rocks shaft $m'$ and its crank-arm $m$ in the direction of the arrow in Fig. 11. As the crank-arm $m$ oscillates, it first radially lifts pawl M into engagement with the carriage-feeding rack $b'$, as indicated in full lines, Fig. 13, and as soon as such engagement is made the further elevation of the pawl causes it to feed or slide the carriage in the direction of its length for the space of one or more teeth, as desired, and as indicated by dotted lines, Fig. 13. At the time the feeding movement of the pawl M for the carriage is effected the rocking of the shaft $m'$ has brought either the fixed pawl M' on said shaft into checking engagement with the carriage-rack $b^2$ or moved crank or presser arm $m^3$ to raise the spring check-pawl M' into like engagement, as indicated by dotted lines, Fig. 12, to prevent any further accidental or undue feed of the carriage while the letter or character is being made. The return movement of the pawls M M' and rocker-shaft $m'$ is made by the retraction of spring $m^4$ as the bail $Q^3$ and its finger $m^5$ falls with the key-lever C in returning to their normal position. The finger $m^5$ is adjustable on bail $Q^3$ in any suitable manner, so that the extent of rocking of the shaft $m'$, and consequently the feed of the carriage, may be varied as desired.

It will be noted that the pawl M is a freely-supported pawl and that as it is pivoted to the crank-arm $m$ on shaft $m'$ the same can be lowered out of engagement with the carriage and raised into engagement with it and then moved to feed the carriage. This function of the pawl permits it to be normally out of contact with the carriage-feeding rack $b'$, and as the checking-pawl M' is likewise normally free from rack $b^2$ the carriage is normally free or independent of the single letter or character spacing feed mechanism or pawl M and also of the check-pawl M', which pawls, as indicated in the drawings, are located on one side of the machine. On the opposite side of the same are located two pawls O O', which engage with the carriage-feed rack $b'$, and are the pawls which feed the carriage variably for spacing for two, three, or more letter words, and which also space for the interval between words. These pawls O O' are separately pivoted to a disk or support $o$ on a rock-shaft $o'$, running lengthwise and having bearings in the ends of the machine. The pawls O O' are practically parallel to one another, and one is longer than the other. (See more plainly Figs 14 and 15.) The distal end of the longest pawl O is in advance of that of the shortest pawl O', and both are weighted at their tail ends. The pivotal points of these pawls are on opposite sides of the vertical center of the disk or collar $o$, one being above and the other below the horizontal center of the disk. The pivot-point of the smaller-length pawl O' is above and in advance of that for the longer-length pawl. Reversely located to the pivotal points for said pawls are pins $o^2$ $o^3$, secured to disk $o$, the pin $o^2$ for the smaller length of pawl O' being below it and that for the longer length of pawl O being above it, the normal position of said pins and pivots being shown in Fig. 43, in which position the pawls are out of engagement with the carriage rack $b'$, said pawls being held out of engagement with said rack by the location of the pins $o^2$. $o^3$, which prevent the weighted ends of the pawls moving them into engagement with the rack $b'$ when said pawls are in their normal position. The carriage B therefore is normally free or independent of said spacing-pawls, and the latter are only brought into engagement with the carriage-rack $b'$ when the shaft $o'$ is rocked, as hereinafter described.

The shaft $o'$ is provided with an arm $o^4$, to which is secured one end of a spring $o^5$, the other end of which is secured to the frame of the machine, as indicated in Fig. 3. A rocking motion imparted to shaft $o'$ in the direction of the arrow $z$, Fig. 14, first releases the pawls from the pins $o^2$ $o^3$, whereupon the weighted ends of the pawls move them into engagement with the carriage-rack $b'$, and then moves the longer-length pawl O in the direction of arrow $z'$, Fig. 14, and the shorter-length pawl O' in an opposite direction, as indicated by arrow $z^2$. The said movement of the longer-length pawl O feeds the carriage from line 1 1 to 2 2, Figs. 14 and 15, while the shorter length slips by the teeth of the carriage-rack from the line 3 3 to 4 4, and said pawls are in the position shown in Fig. 15, the carriage having been fed by the longer-length pawl O a distance of two teeth of the rack $b'$. A return movement of shaft $o'$, under the influence of the retraction of spring $o^5$, reversely moves the pawls O O', the shorter-length pawl O' now moving in the direction of arrow $z''$, Fig. 14, from line 4 4 to 3 3 to feed the carriage two teeth of the rack, and the longer-length pawl O receding from line 2 2 to 1 1 slipping by the teeth of the rack during its recession. At the terminal end of this last-described position the pins $o^2$ $o^3$ contact with the pawls to lower their outer or distal ends from the carriage-rack $b'$ to their normal position. (Shown in Fig. 43.) The effect of this construction is to move the points of the pawls O and O' in opposite directions to increase the distance between the pawl's points when the shaft is rocked in one direction and to decrease the distance between the points when said shaft is rocked in the other direction.

From the foregoing it will be noted that the feeding action of the pawls O O' for the carriage is that one movement of the pawls causes one of them to feed the carriage for a portion of the space required and a return movement of the pawls causes the other one of them to feed the carriage for the remaining portion of the required space, and in the interval between such feeding the word is struck or printed, as hereinafter described. As the carriage B is normally not in engagement with its two separate feeding mechanisms, it is normally free to slide in the guideways in either direction and to any desired extent to suit the work to be done, and as it slides in open end guideways the carriage can be instantly removed from the machine and another of different length substituted for printing on extended widths of paper, and this avoids the necessity of making specially large machines for large or extended lengths of paper-carriages, as has heretofore been the case.

By the foregoing it will be seen that while the carriage is normally disengaged from its feeding and checking mechanism it can be moved at any time by operating one of the key-levers. In printing, the key-levers move the carriage to position the paper before the impression is made and while the key-lever is being depressed to position the type to be impressed. They also move the checking mechanism of the carriage, so that when a key-lever is depressed it moves the carriage longitudinally and then checks its movement and locks it against further movement in either direction until the downstroke of any of the keys is completed, and then releases said carriage as soon as said key is released. In other words, the feeding and checking pawl act upon the rack-teeth of the carriage consecutively at each operation of a key-lever. The feeding-pawl first moves in engagement with the rack-teeth on the carriage, then moves forward in the direction of traverse of the carriage which is carried with said pawl, then moves out of engagement with the rack-teeth, and moves back to its normal position free from said carriage. At the same time that the feeding-pawl has completed its forward movement, the checking-pawl engages the rack-teeth and holds the carriage rigidly in place until the impression has been made, when it moves out of engagement with said rack-teeth coincident with the outward movement of the feeding-pawl and then moves back to its normal position.

When this device is used in combination with a type-wheel that is moved axially to position a type by any of a series of key-levers, the paper-carriage and said type-wheel have motion imparted to them on the downward movement of the key-lever even when said type-wheel is moved against a platen to impress a positioned type upon a platen by a further downward movement of the key-lever.

To give additional support for extended lengths of carriages, fixed side arms or brackets $B^5$ on the machine-bed, having suitable guideways or supports for the carriage, may be used, as indicated by dotted lines in Fig. 39, or hinged or pivoted arms or brackets $B^5$, with end-supporting rollers $B^6$, may be substituted, as shown by full lines in Fig. 39. The advantage of using the hinged or pivoted brackets $B^5$ is that when long carriages are not used and when the machine is packed for transportation or other purposes the brackets $B^5$ can be swung around to one side of the machine to reduce its transverse width, as indicated to the right of Fig. 39, or removed entirely from the machine. As the carriage is normally free to slide to and fro in either direction, it can be most advantageously used in connection with a ruling device, by which underscoring of words or lines, the canceling of words or lines, and the filling in of blank spaces may be accomplished independently of the actuating levers or mechanism of the machine. The ruling device is normally out of contact with the platen, and when in use is held against the platen, which when moved will revolve the wheel, if one be used. The particular advantage of such a combination is that ruling can be done independently of the actuating mechanism of the machine, so that it is not necessary to move the carriage step by step by operating the key or space levers, nor to hold away some part of the mechanism while the ruling device is acting upon the paper to underscore, cancel, or fill a blank space. By using a platen that can be freely revolved any line can be treated in the aforesaid manner, and the operation may be performed while each of the lines are being printed or after part or all of the lines to be underscored or canceled have been printed. By having a freely-sliding carriage this work can be done very rapidly, as one line can be ruled from right to left, the next one from left to right, and so on, beginning on the next line immediately under the point where the last line was finished until the work has been completed. If desired, the rollers or platen may be rotated while the carriage is being moved longitudinally, a suitable ruling device being arranged for that purpose. One of the preferred forms is that shown in the drawings, which consists of a separate underscoring device R and a separate canceling and blank-space-filling device R', located adjacent to the carriage B, preferably as indicated in Fig. 1; but they may be otherwise located, as desired. These devices are, however, in the form of machine shown, preferably pivoted at their ends $r$ to standards $r'$ on the machine in front of the carriage, so that they can be thrown up into contact with the paper on roller $B^3$. Each device consists of a casing $r^2$, having an open face or top $r^3$, preferably, and provided with a shaft $r^4$, carrying an inking-pad $r^5$, above which and suitably journaled is another shaft $r^6$, carrying a marking wheel or roller $r^7$, part of the periphery of which projects through and beyond the open face or top $r^3$, as indicated more plainly in Figs. 40 and 41, for underscoring, canceling, and filling in blank spaces on the paper on the carriage-roller $B^3$.

To accomplish any of the above-described results for a line of writing, it is only necessary to raise the underscoring or canceling and blank-space device to and hold it against the carriage-roller with one hand and with the other slide the carriage to and fro. It is obvious that one of said devices with a roller or wheel can be used for underscoring, canceling, or filling in blank spaces. In this case the wheel $r^i$ would be normally arranged to cancel or fill in blank spaces, and to underscore the roller $B^3$ would have to be given a slight turn by means of its shaft knob or handle $b^6$ to raise the printed matter above the wheel $r^i$, which would take more time, which is avoided when separate devices are used, as the separate wheels $r^7$ therefor can be differently located on the shafts $r^6$, as shown in Fig. 1, to either mark below or through the printed matter for underscoring, canceling, or filling in blank spaces without necessitating turning of roller $B^3$. The underscoring and canceling wheel or roller $r^7$ may be similar in form, and if the periphery be provided with teeth that make marks like periods or hyphens no other means need be used for revolving the feeding-pad $r^5$ for inking the wheel $r^7$, as its teeth catch the pad and turn it so that fresh inking-surfaces will be continuously presented to the wheels $r^7$. In practice I prefer to use a wheel $r^7$, having two parallel rows of teeth of periods or hyphens. Where a distinct device is used for canceling and filling in blank spaces I prefer to make the wheel $r^7$ for the underscoring device R with a V-shaped periphery, so as to make a continuous fine line under the matter underscored. If desired, the canceling-wheel may also have a smooth periphery, and in both of these cases a second toothed wheel $r^8$ is placed upon the shaft $r^6$ for turning the inking-pad $r^5$, as said smooth wheels $r^7$ will not turn said pad, the wheels $r^8$ being of such diameter as preferably not to project beyond the face or top of the casing $r^2$. The ink is applied to the pads through one of the sides of the casing, which is left open or cut away for that purpose, as more plainly indicated in Fig. 41 by dotted lines $r^9$. This open side may be closed by any suitable slide $r^{10}$, pivoted at any suitable point. If both the underscoring and canceling devices are used and placed side by side, as shown in Fig. 1, I prefer to hinge the slide $r^{10}$ in the pivot between the two casings $r^2$ and have the open sides $r^9$ in said casings opposite each other, so that one slide $r^{10}$ will close both openings when the two devices are in their normal position. When one of the devices is raised, the slide $r^{10}$ covers only one of the openings $r^9$; but as they are not separated for any length of time evaporation of the ink and accumulation of dust in the casing will be very small. When both devices are used, each may have different-colored inks in the pads, so that there will be a clear distinction between the two.

To direct the paper upwardly over the carriage-roller $B^3$, as well as to press or support it in proper position thereon to receive the impressions, I employ spring-pressure fingers $B^7$, vertically located, curved to conform to the diameter of the roller $B^3$ and secured to a shaft $B^8$, journaled in bearings $B^9$ on the machine in front of the carriage. The spring $B^{10}$ for normally pressing said fingers against the roller $B^3$ is secured at one end to the shaft $B^8$ and at the other to the machine. Two of these fingers $B^7$ are located adjacent to the fixed posts $x^3$ for the inking-ribbon $x$ and the other at the side of the machine toward which the carriage feeds, and this third finger is used to more fully support the paper on the roller $B^3$, especially when the carriage has moved to carry the paper past the first finger to the right of the machine. If desired, the additional fingers $B^7$ may be secured to shaft $B^8$ for use with a long length of carriage.

Near the front ends of rock-shafts K and $o'$, or adjacent to the key-board, more plainly shown in Fig. 3,) are secured, respectively, oppositely-directed plates K' and S, the plate K' on shaft K having a more acute inclination than that of the plate S on shaft $o'$, as more plainly indicated in Fig. 30, the plate S being preferably nearly horizontal. Arranged transversely to these plates and above the same are finger-levers T T, of which any desired number may be used. These finger-levers may be pivoted to the one side of the frame, as indicated at $t$, or to a shaft or rod mounted in the front end of the machine and cross-bar $n^4$, as indicated by broken dotted lines $w$, Fig. 3, the opposite end of said levers projecting beyond the opposite side of the frame and having suitable keys $t'$, as shown to the left of Fig. 3. Each one of these levers carries an adjustable pin or screw $t^2$, preferably the latter, as it is then adjustable for impingement against the plate S to rock it and in turn the shaft $o'$ to actuate the double pawls O O' for variably feeding the carriage to space for the word characters, as hereinbefore set forth. As the pin $t^2$ for each said lever T is adjusted, the different levers T will when depressed differently rock the shaft $o'$ to vary the extent of feed of the double pawls O O' for two, three, or more letter words. When the finger-levers T are depressed, they are returned to their normal position by suitably-located reaction-springs $t^3$, and as they return the shaft $o'$ is free to be returned by its retraction-spring $o^5$ to complete the variable feeding of the carriage B for the word-spacing, as hereinbefore set forth. A depression of the finger-levers T to rock plate S and shaft $o'$ also rocks plate K' on shaft K to cause its finger $k$ to move frame or yoke $J^3$ for vertically shifting the type-wheel to bring into position the rows or fields of characters, as hereinbefore set forth, which in this case is the word row or field; but as the plate K' is the more acutely inclined the finger-levers T first come into contact with and partially rock plate K' to initially actuate the said shifting mechanism for vertically moving the type-wheel before coming into contact with and rocking plate S, so that when both plates are fully rocked the type-wheel is fully shifted and one part of the spacing for the word is made before the representative key-lever is depressed to make the impression. Each one of the finger-levers T rocks plate K' to the same extent as they act on said plate to effect the shifting of the type-wheel to bring its word row or field into position.

For shifting the type-wheel to bring its other fields or rows into position separate keys V V' are used for rocking the plate K', which keys are graduated to vary the extent of rocking of said plate in order to vary the shifting movement of type-wheel G to bring the proper field or row into position. These keys V V' are vertically located over the plate K and have bearings $v$ in the top of the machine and also reaction springs $v'$ for raising them to their normal position after being depressed. The key V controls the shifting of the type-wheel for the "cap" letter row or field, and to hold it in its depressed position for continuously writing caps I provide a suitable catch $v^2$, pivoted to the under side of the top of the machine, which catch has an actuating knob or handle $v^3$ projecting through the top of the machine (see more plainly, Fig. 2) for engagement with an annular recess $v^4$ on the key, a suitable kerf $v^5$ being made through the bearing $v$ for said key for the catch $v^2$ to pass through to engage with its annular slot $v^4$. (See Fig. 29.) As many keys V V' will be used as there are rows or fields on the type-wheel, excepting the first row or field and the word-rows, when the word characters are assembled in rows.

Above one end of plate S and resting thereon and also loosely mounted on rocker-shaft $o'$ is an arm S', the outer end $s$ of which passes to and stands beneath the spacer-bar $S^2$, which is above the banks of keys C. (See more plainly Figs. 3 and 33.) Said spacer-bar $S^2$ is loosely mounted upon cross-shaft $Q^2$, so that when bar $S^2$ is depressed neither the cross-shaft $Q^2$ nor bail $Q^3$ is actuated to rock shaft $m'$ to actuate the feeding-pawl M. A movement of the spacer-bar $S^2$ therefore does not actuate the carriage-feeding pawl M for spacing for the single letters or characters. A depression of the spacer-bar $S^2$ correspondingly moves arm S' to cause it to rock shaft $o'$ slightly to correspondingly actuate the double pawls O O' in a manner as hereinbefore set forth, to feed carriage for obtaining the spacing between the words written in the usual manner—that is, letter by letter. The arm S' and spacer-bar $S^2$ are relatively so arranged that the movement of arm S' is such that the double pawls O O' are actuated to move the carriage the extent of feed required for the interval spacing between the words. As the spacer-bar $S^2$ is independent of the single feed-pawl M for the carriage or only actuates the independent double pawl-feed O O', it admits of a depression of any of the key-levers C to make an impression of a single letter and simultaneously therewith of the depression of the spacer-bar $S^2$, so that the spacing for the last letter of a word and the spacing between it and the next word is accomplished to greatly increase the speed of writing. This described result is produced by reason of the fact that when the key-lever C is depressed the movement of the bail $Q^3$ actuates the single feed-pawl M to feed the carriage and the depression of the spacer-bar $S^2$ actuates the double pawls O O', the longer one then feeding equally in extent and simultaneously with that of the single feeding-pawl M, or, in other words, the feed of said single pawl M and longer pawl O is the same and the carriage only moves the distance of the feed of the single pawl M to space for the last letter of the word to be struck; but as soon as this is effected and the key-lever C and spacer-bar $S^2$ return to their normal position the return movement of the short pawl O', under the influence of spring $o^5$, as hereinbefore described, feeds the carriage to make the space between said last letter of the word struck and the next word. It will be noted, therefore, that though the key-lever C and spacer-bar $S^2$ are simultaneously depressed the spacing for the last letter of the word and that for the space between the word are successively made, the one by the depression of the lever and spacer-bar and the other occurring during their return movement. In other words, the carriage receives two separate successive and positive impulses, one of which impulses is caused by the depression of one of the type-key levers, which acts upon the feeding-pawl to feed the carriage one step, so that the letter to be printed will be properly impressed upon the paper on the platen, and the other by the depression of the spacer-lever, which moves a spring-held pawl in contact with the feeding-rack of said carriage, so that when the feeding-pawl is withdrawn from contact with the carriage-rack the spring-actuated pawl forces the carriage ahead another step and makes a space between the last letter of the word just printed and the first letter of the next word to be printed.

The unison or general operations of the machine for writing are as follows, premising that the normal position of the type-wheel as regards the fields or rows thereon is such that the upper or first row, which is for lower case, is normally in position for action and any key-lever C depressed effects the following simultaneous movements: First, the bail $Q^3$, with its finger $m^5$, is raised to rock wiper or arm $m^6$, rock-shaft $m'$, and its crank-arms $m$ $m^8$ in the direction of the arrow, Fig. 11, to raise feeding-pawl M from its normal position shown in Fig. 48 to the position shown in full lines Fig. 13, for engaging the feed-rack $b'$ of carriage B, and then to the position indicated in dotted lines in said Fig. 13 to feed the carriage one or more teeth, as desired, and also to raise the spring check-pawl M' into engagement with the carriage-rack $b^2$ at a time when the feeding-pawl M is making its end movement in feeding the carriage, which feeding of the carriage occurs before the impression is made; second, according as a letter near to or far away from the central or zero point of the ratchet H' is to be placed in position either one of the right and left bails J and L' or bail $L^2$ is first moved to cause either one of the bails L or L' to engage its pin $l$ with one or the other of the racks I or I' to rotate the type-wheel shaft F, type-wheel G, the concentric ratchet-wheel H, and ratchet H' in one direction to position the letter and to cause the bail L² to engage with the proper tooth of the ratchet H' to lock said parts and stop rotation of the type-wheel, and, further, to cause said bail L² to tilt the frame E to carry the type-wheel toward the carriage-roller B to make the impression. Before this is done, however, the following movement is made: third, the bail N is raised by the key-lever coming into contact with the respective graduated screw $n$ thereon, which raises link $n'$ to elevate catch-lever $n^2$ from the pin $n^6$ on frame E, so that it is free from lever $n^3$ as soon as the bail L² is in position to tilt frame E and the type-wheel G to make the impression. As the wheel G approaches the carriage-roller B, said wheel G meets the inking-ribbon $x$ in front of it and both move together, which draws the ribbon taut, so as to make a clear or unblurred impression; fourth, the raising of the bail Q³ for operating feeding-pawl M, as above described, also rocks shaft Q² and in turn the rocker-arm Q' to move the pawl $q^7$ or $q^8$ of the spool P or P', which is then the winding-spool, in the direction of the carriage B to get into position for imparting a movement to the winding-spool as the bail Q³ and the key-lever depressed are returning to their normal position, which movement takes place as soon as the finger-pressure is released from the key-lever, whereupon the spring-bail I² in front of the segmental racks I or I' acts upon either one of said racks to reversely rotate it to return the type-wheel shaft, type-wheel, the concentric ratchet H, and ratchet H' to their normal position, and then acts upon both racks to bring the tilting frame to its normal position. Meanwhile the spring $m^4$ of pawl M reacts to return shaft $m'$ to its normal position, which in turn disengages the pawls M M' from the carriage-racks $b'$ $b^2$, or returns said pawls to their normal position. Meanwhile the bail N returns to its normal position to lower lever $n^2$ into locking engagement with the type-wheel-shaft, carrying and tilting frame E, to prevent any accidental or other movement of the same independent of its propelling-bail L². The key-levers C return to their normal position by gravity superinduced by the action of spring presser-bail I², through the medium of the segmental racks I I' and bails L, L', and L². To limit the return movement of the key-levers C, their ends $c'$ may rest upon or abut against the cross-bar $c^x$. All of said movements occur in practice almost simultaneously, and whenever a key-lever C is depressed and released and the carriage B is fed from right to left of the machine, and after moving or feeding to print a line, it is moved back by the operator to the right of the machine with one hand, and, if desired, at the same time with the other hand the operator actuates the pawl $b^{14}$, as hereinbefore described, to turn the roller B to space for the lines of printing. To limit the return movement of the carriage at a predetermined position, a stop-bar $b^{25}$, having a bent end $b^{27}$ and mounted in the standards B' B², may be used. Said bar $b^{25}$ is preferably adjustable by means of a set-screw $b^{26}$, so that its bent end $b^{27}$ may be projected more or less beyond the left-hand side of the carriage to abut against the corresponding edge of the top $a^3$ of the carriage-support A' to stop the return movement of the carriage, as desired. As the carriage B is normally free to slide backward and forward, it is always ready to be used in connection with the underscoring and canceling and blank-space-filling-in devices R R', and, further, as the roller B can be turned by the knob $b^6$ at any time, canceling of letters or words in matter already printed, as well as in that being printed, can be easily and expeditiously effected. As the reversing of the feed of the inking-ribbon is automatically effected, attention thereto on the part of the operator is dispensed with, which admits of a concentration of effort to secure increased speed or rapidity of writing. In writing occasional caps or other letters or characters not contained in the first row or field on the type-wheel, one of the finger-keys V V' is depressed to rock plate K' and rock shaft K and its finger $k$, which in turn slides the yoke J³ to the right to elevate its link connection J⁶ with the sleeve J on the tilting frame E to cause said sleeve J and arm J' thereon to vertically shift the type-wheel G to bring the proper or desired field or row into position, said parts being returned to their normal position by the retraction of the yoke-spring J⁵ when pressure is released from the keys V or V'. When caps are to be written continuously, the finger-key V is depressed and is held or locked in its depressed position to maintain the type-wheel G in its vertically-shifted position by moving the catch V² into locking engagement with the annular recess $v^4$ on said finger-key. When released, by releasing the catch $v^2$ the finger-lever is returned to its normal position by its spring $v'$. To print words, any one of the levers T is depressed, which first rocks plate K', shaft K, and its finger $k$ to slide yoke J³ and actuate sleeve J to shift the type-wheel to bring the word-row in position, in a manner hereinbefore described, and at the same time the pin or screw $t^2$ on said lever T rocks plate S and shaft $o'$ to actuate the double pawls O and O' to cause the pawl O to move the carriage to make part of the spacing or feed for the word-character and move the pawl O' backwardly or to the right to get into position to further move the carriage B and complete the spacing for the word with the interval between it and the next letter or word to be struck, if desired, on the release of the lever T and the return of the pawls O and O' and shaft $o'$ to their normal position, as hereinbefore described. The levers T have their pins $t^2$ adjusted so as to effect the required depression and consequent rocking of plate S and shaft $o'$ to produce variable feed of the carriage B and consequent spacing for two, three, or more letter words, there being preferably one lever T for the different-lettered words; but this representativeness of the finger-keys T is not essential, as the use of the spacer-bar $S^2$, in connection with one finger-lever T, by an expert writer on my machine will admit of variable spacing for different-lettered words, the same as if separate levers T for two, three, or more lettered words were used. The spacer-bar $S^2$ not being in engagement with the carriage-feeding pawl M for spacing for separate letters, but in engagement with the double pawls O O', through the medium of finger S', a depression of said bar $S^2$ actuates said pawls O and O' to produce a successive feed of the carriage when the spacer-bar is pressed down and when it returns to its normal position, as hereinbefore described, but to a less extent of feed, and as the carriage feed or movement by pawl O, effected by the depression of the spacer-bar $S^2$, is equal in extent to that made by the pawl M when a letter is struck, it follows that when a key-lever C and the spacer-bar $S^2$ are depressed at once in striking the last letter of a word, the carriage B only feeds or spaces for said letter when said lever and bar are depressed, and when they return to their normal position the pawl O' acts to feed or space the carriage B for the interval between the said word and the next letter or character to be struck. As the type-wheel G is of hard rubber, as is also its eccentric H' and the concentric wheels H and H', their inertia is easily overcome when rotated, and when tilted do not give undue velocity and force of blow to the type-wheel. On the contrary, the type-wheel, being hollow, tends to cushion the blow, so as to prevent undue wear of the type and yet at the same time give the necessary force of blow required for printing single or manifold copies. The feature of the independent removable carriage B to admit of the substitution of a longer carriage very materially increases the scope of work of a machine, so that one machine answers for all kinds of work, instead of having to have different machines for different kinds of work, as heretofore. The raised removable cap $A^3$ admits of easy access to the ribbon-spools P P' for replacing the ribbon, and to the type-wheel G for replacement of same or any of the actuating parts on the shafts F and D, and also affords easy access to the adjusting mechanism for the finger or arm $m^5$ of bail $Q^3$, and for the graduated pins or screw $n$ on bail N. The word letters or characters are placed upon the different keys $C^3$ for the key-levers C in any suitable manner, as indicated in Fig. 1. The more word-types used the greater will be the number of keys $c^3$ representative of a word-type. By making the key-levers C serve for letters and words as well also for other characters a less number of key-levers C and a smaller key-board are required. The key-levers C are preferably made or stamped out of thin sheet-steel, so as to be light and strong. It will be noted that but a single type-wheel having a number of rows or fields is used, and they all move together when it is shifted and when it is rotated. The shaft D or the pivotal point of the tilting frame is so located below the top $a^3$ of the carriage-frame support A' that the type-wheel shaft F, as well as the frame E, when in their normal positions, are inclined or pointed away from the carriage-roller $B^3$, and the plane of the wheel is substantially below the horizontal center of the roller $B^3$, so that the writing or printing from end to end of the line, or so much thereof as is printed, is fully exposed to the operator for inspection as to its correctness, and to aid in carrying in the mind the matter to be written, and mistakes, if any are made, can at once be seen and corrected. The sides, ends, and tops or covers of the frame A, except the top plate $a^3$ for the paper-carriage support, are made preferably of hard rubber, so as to make the frame of the machine strong and durable and of light weight for carrying purposes, and also to cushion the sound of the actuating parts. Furthermore, the frame A forms a casing for covering all the actuating parts of the machine and the inking-ribbon spools, and having in its removable cap a slot or recess at its rear end for the type-wheel to rotate and vibrate in, thus excluding, as far as it is possible to do, dust and dirt to said actuating parts and the inking-ribbon spools.

It is obvious that the constructions and arrangements of the novel features of my improvements may be greatly varied without departing from the spirit of my invention, and hence I do not limit myself to the same as shown and described. So, too, it is also obvious that the freely-sliding carriage B, the underscoring, canceling, and blank-filling-in devices R R', the hollow hard-rubber type-wheel G, and automatically-acting shifting mechanism under the control of the winding-spool for changing the direction of feed for the inking-ribbon are, with minor changes, applicable to different forms of existing or other type-writers.

I do not herein claim the special construction of ruling device shown in Patent No. 432,298, granted to me July 15, 1890.

What I claim is—

1. In a type-writing machine, the combination of a type-wheel which moves axially to position a type and vibrates laterally to impress said type, a paper-carriage which moves the paper during each vibration of the type-wheel, mechanism for moving said carriage which is normally out of engagement with said carriage, and key-levers which when actuated move the said type-wheel axially and vibratorily and move the carriage-actuating mechanism first into contact with said carriage and then to move the said carriage longitudinally.

2. In a type-writing machine, the combination, with a series of key-levers, of a paper-carriage feeding and checking mechanism actuated by said key-levers, and a carriage normally disengaged from said feeding and checking mechanism.

3. In a type-writing machine, a paper-carriage normally disengaged from its actuating mechanism and free to be moved manually in either direction, in combination with a feeding, checking, and locking device which is operated by the key-levers and is brought into action with said carriage, moves the same longitudinally, and then checks its movement and locks it against movement in either direction until the downward stroke of any of said keys is completed, and then releases said carriage as soon as the said key is released.

4. In a type-writing machine, a paper-carriage, in combination with a feeding, checking, and locking device which is operated by the key-levers and is brought into action with said carriage, moves the same longitudinally, and then checks its movement and locks it against movement in either direction until the downward stroke of any of said keys is completed.

5. In a type-writing machine, the combination of a paper-carriage, rack-teeth on said carriage, a feeding-pawl which first moves into engagement with the rack-teeth on said carriage, then moves forward in the direction of traverse of said carriage and carries said carriage with it, then moves out of engagement with said rack-teeth, and then moves back to normal position free from said carriage, a checking-pawl which first moves into engagement with the rack-teeth on said carriage as soon as the feeding-pawl has completed its forward movement, then moves out of engagement with said rack-teeth coincidently with the outward movement of the feeding-pawl, and then moves back to normal position, and key-levers which control the movements of said pawls.

6. In a type-writing machine, the combination, with a paper-carriage having rack-teeth thereon, of a feeding-pawl and a checking-pawl which act upon the rack-teeth of said carriage consecutively and hold the carriage against movement in either direction at each operation of a key-lever.

7. In a type-writing machine, the combination, with a paper-carriage having rack-teeth thereon, of a feeding-pawl which engages the rack-teeth and pushes the carriage and a checking-pawl which engages the rack-teeth and checks the movement of the carriage as soon as the feeding-pawl has completed its pushing movement and holds the carriage against movement in either direction.

8. In a type-writing machine, the combination of a paper-carriage, feeding and checking racks, a feeding-pawl, a checking-pawl, the feeding-pawl first moving into engagement with said feeding-rack, then moving said feeding-rack to feed the carriage, the check-pawl then moving into engagement with the check-rack, and then both pawls withdrawing from their engagement with said racks, a series of key-levers, and actuating mechanism for controlling the movements of said pawls, substantially as set forth.

9. In a type-writing machine, the combination of a paper-carriage, a feeding-pawl pivoted on a crank-arm of a rocker-shaft, a carriage-check pawl secured to the machine and normally out of engagement with the paper-carriage, a crank-arm on said rocker-shaft which engages with said check-pawl, a series of key-levers, and actuating mechanism for said rocker-shaft under the control of all of said key-levers.

10. In a type-writing machine, the combination of a rocker-shaft $m'$, having crank-arms $m\ m^3$, the pawl M, pivoted to crank-arm $m$, a pin-and-slot connection between crank-arm $m$ and pawl M, a pawl M', secured to the machine and in engagement with crank-arm $m^3$, and a series of key-levers and actuating mechanism for said rocker-shaft, substantially as set forth.

11. In a type-writing machine, the combination of a type-wheel which is moved axially to position a type and vibrated to impress said type, a paper-carriage which is moved longitudinally to position the paper for a new impression, and a system of key-levers, any of which will impart said movements to said type-wheel and carriage during its downward movement.

12. In a type-writing machine, the combination of a type-wheel which is moved axially to position a type and vibrated to impress said type, a paper-carriage normally free to move and which is moved longitudinally to position the paper for a new impression and locked against undue movement, and a system of key-levers, any of which will impart said movement to said type-wheel and carriage during its downward movement.

13. In a type-writing machine, the combination of a type-wheel which is moved axially to position a type, a paper-carriage normally free to move and which is moved longitudinally to position the paper for the impression of said type, and a system of key-levers, any of which will impart said movements to said wheel and carriage during its downward stroke.

14. In a type-writing machine, the combination, with a paper-carriage and a platen or paper-supporting roller thereon, of a ruling device which is operative against said platen or roller independently of the actuating mechanism of said machine.

15. In a type-writing machine, the combination, with a paper-carriage and a platen or paper-supporting roller thereon, of a revolving ruling device which is operative against said platen or roller independently of the actuating mechanism of said machine and is operated to rule the paper by a movement of said roller or platen.

16. In a type-writing machine, the combination, with a paper-carriage which is normally free to be moved upon its ways manually, of a ruling device normally out of contact with the platen and which can be held in action against the platen or roller of said carriage while the said carriage is being so moved.

17. In a type-writing machine, the combination, with a sliding paper-carriage having an intermittent turning mechanism for one of its presser-rollers, which mechanism is normally out of engagement with the roller, of a separate turning knob or handle for said roller, and an underscoring, canceling, or blank-space-filling device independent of the actuating mechanism for the machine, substantially as set forth.

18. In a type-writing machine, the combination, with a paper-carriage which is free to be moved manually upon its ways, of a ruling device independent of the actuating parts of said machine and normally out of contact with the platen and which can be held in contact therewith while the carriage is being so moved upon its ways.

19. In a type-writing machine, the combination, with a paper-carriage which is free to be moved manually in either direction upon its ways, of a ruling device independent of the actuating parts of said machine and normally out of contact with the platen and which can be held in contact therewith while the carriage is being so moved upon its ways.

20. In a type-writing machine, the combination of a series of type adapted to be impressed upon a platen, a paper-carriage for carrying the paper laterally past the type-impressing point and which is normally free from its actuating mechanism and capable of being freely moved manually in either direction, a roller-platen journaled on said carriage for moving the paper vertically past the type-impressing point and which is normally free from its actuating mechanism and capable of being freely rotated manually in either direction, and a ruling device which is held against said platen, whereby lines may be drawn diagonally on the paper by manually sliding said carriage and turning said platen at the same time.

21. In a type-writing machine, the combination, with a series of type key-levers, one or more spacing-levers, and a paper-carriage, of two separate positively-acting feeding mechanisms for said carriage controlled, respectively, by the type key-levers and the spacing-levers, one of which moves the carriage while its actuating-key is being depressed and the other moves the carriage when its actuating-key is reacting, whereby when one of the type key-levers and one of the spacing-levers are actuated simultaneously the carriage will receive two separate successive and positive impulses.

22. In a type-writing machine, the combination, with a series of type key-levers, one or more spacing-levers, a series of type under the control of said type key-levers, and a paper-carriage, of two separate positively-acting feeding mechanisms for said carriage, one of which is controlled by the type key-levers and moves the carriage conjunctively with the impression of the type and the other is under the control of the spacing-levers, and one moves the carriage while its actuating-lever is being depressed and the other while its actuating-lever is being reacted, whereby when one of the type key-levers and one of the spacing-levers are simultaneously actuated a type will be impressed and the carriage will receive two separate successive and positive impulses.

23. In a type-writing machine, the combination, with a series of type key-levers, one or more spacing-levers, a series of type under control of said type key-levers, and a paper-carriage, of two separate positively-acting feeding mechanisms for said carriage, one of which is controlled by the type key-levers and moves the carriage immediately preceding the impression of a type and while the actuating key-lever is being depressed and the other feeding mechanism is under the control of the spacing-levers and moves the carriage while the actuating-lever is being reacted, whereby when one of the type key-levers and one of the spacing-levers are simultaneously actuated the carriage will receive two positive successive impulses and the type will be impressed between said impulses.

24. In a type-writing machine, a paper-carriage having in combination therewith a feeding-pawl under the control of the key-levers, separate double feeding-pawls for the carriage, and actuating mechanism for moving one of the double pawls to feed the carriage and at the same time placing the other pawl in position to further feed the carriage when both double pawls return to their normal position, substantially as set forth.

25. In a type-writing machine, the combination of a paper-carriage, a rocker-shaft, pawls O and O', the distance between the points of which is increased when the shaft is rocked in one direction and decreased when rocked in the opposite direction, a retracting-spring for the shaft, and finger-levers for controlling the movements of the shaft.

26. In a type-writing machine, the combination of a paper-carriage-feeding rack, a rocker-shaft having mounted thereon two pawls, the distal end of one being in advance of the other, and actuating devices under the control of finger-levers for moving said pawls in opposite directions when said levers are depressed and in returning to their normal positions, substantially as set forth.

27. In a type-writing machine, the combination of a paper-carriage-feeding rack, a rocker-shaft having mounted thereon two pawls, the distal end of one being in advance of the other, actuating devices under the control of finger-levers for moving said pawls in opposite directions, and devices for normally maintaining the pawls out of engagement with the carriage-rack, substantially as set forth.

28. The combination, with a rack-bar, of a rocker-shaft $o'$, having plate S, the collar $o$ on said shaft, pawls O and O', pivoted to said collar one above the other and on opposite sides of the vertical center line of the collar, pins $o^2$ $o^3$ for said pawls, and a retracting device for said shaft, substantially as set forth.

29. The combination, with a rack-bar, of a rocker-shaft $o'$, having plate S, the collar $o$ on said shaft, pawls O and O', pivoted to said collar, one above the other and on opposite sides of the vertical center line of the collar, pins $o^2$ $o^3$ for said pawls, a retracting device for said shaft, and actuating-levers T, substantially as set forth.

30. In a type-writing machine, the combination of a vertically-shifting type-wheel, a sliding paper-carriage, the rocker-shafts $o'$ and K, pawls O O' on shaft $o'$, shifting mechanism between shaft K and said type-wheel, and plate K' on shaft K, plate S on shaft $o'$, and levers T, having pins $t^2$ for contact with plate S, and the levers T, contacting with plate K', substantially as set forth.

31. In a type-writing machine, the combination of a shiftable type-wheel, a paper-carriage, a variable feed for said paper-carriage, a finger-key which acts to vertically shift said type-wheel and actuate said variable feed, and other finger-keys which act only to shift the type-wheel, substantially as set forth.

32. In a type-writing machine, the combination of a vertically-shifting type-wheel, the rocker-shaft K, actuating mechanism between said type-wheel and shaft K, plate K' on said shaft, and keys V V', disconnected from and for rocking said plate K' to vertically shift said wheel, substantially as set forth.

33. In a type-writing machine, the combination of a vertically-shifting type-wheel, the rocker-shaft K, actuating mechanism between said type-wheel and shaft K, plate K' on said shaft, levers T, and keys V V', disengaged from and for separately rocking said plate K' to vertically shift said wheel, substantially as set forth.

34. In a type-writing machine, the combination, with a shifting type-wheel and a paper-carriage-feeding mechanism, of shaft $o'$, having plate S, the shaft K, having plate K', finger-levers T, arranged transversely across the top of said plates for contact with the same, and separate keys V V' for plate K', substantially as set forth.

35. In a type-writing machine, the combination, with a paper-carriage having a rack-bar thereon, of the rocker-shaft $o'$, having rack-engaging mechanism and the plate S thereon, the pivoted arm S', resting on said plate S, and the spacer-bar $S^2$, contacting or engaging with arm S', substantially as set forth.

36. In a type-writing machine, the combination, with an axially-moving type-wheel and means for axially moving said wheel, of a stopping-ratchet device independent of said means, and a locking-ratchet device which is brought into action after the stopping device has acted, whereby the axial movement of the wheel is first arrested and then the wheel is locked against any axial movement.

37. In a type-writing machine, the combination, with a series of actuating key-levers, a type-wheel which is moved axially to position a type and then laterally to impress a positioned type during the downward movement of the actuating key-lever, and means for axially moving said wheel, of a ratchet device independent of said means which stops the axial movement of the type-wheel, and a second ratchet device which locks the type-wheel against any axial movement before the key-lever has completed its downward movement, whereby the wheel is moved axially to position a type and then locked to hold it in that position, and then further actuated laterally to impress the type while the key-lever is being depressed.

38. The combination of a tilting type-wheel-shaft-carrying frame, a type-wheel having means for vibrating and axially moving it, an eccentric and a concentric ratchet-wheel on said shaft, a movable frame for engaging and vibrating with said eccentric ratchet, and a fixed finger or projection for engagement with said concentric ratchet, substantially as set forth.

39. The combination of a tilting type-wheel-carrying frame, a shiftable type-wheel on said shaft, means for rotating said wheel, an eccentric ratchet and a concentric ratchet-wheel on said shaft, and devices for engaging with said ratchet and concentric wheel, the device engaging said ratchet tilting therewith, substantially as set forth.

40. In a type-writing machine, the combination of a type-wheel, means for rotating said wheel, an eccentric ratchet and a concentric ratchet-wheel moving coincidently, propelling mechanism for rotating said ratchet and wheel, propelling mechanism for moving and moving with said ratchet and wheel to the impression-pad, and devices for engaging with said concentric ratchet as the type-wheel approaches the impression-pad, substantially as set forth.

41. In a type-writing machine, the combination of a type-wheel, means for rotating said wheel, a ratchet the teeth of which move in different concentric paths of varying lengths coincidently with the type-wheel, a pawl moving independently of said means and having graduated movements inversely proportional to the movements of the ratchet-wheel for engaging the latter, a ratchet-wheel the teeth of which move in the same path coincidently with the type-wheel, and a pawl for engaging the said ratchet-wheel, substantially as set forth.

42. In a type-writing machine, the combination, with an axially-moving type-wheel, means for rotating said wheel, of a stopping-ratchet the teeth of which move in different paths concentric with the axis of said wheel, a locking-ratchet the teeth of which move in the same path concentric with the axis of the wheel, and two pawls which engage their respective ratchets consecutively, the pawl of the stopping-ratchet being independent of said means, substantially as set forth.

43. In a type-writing machine, the combination, with a type-wheel which moves axially in either direction from an initial point to position its type and means for rotating said wheel, of a stopping-ratchet having two sets of oppositely-pointed teeth, the teeth of each set moving in different paths concentric with the axis of said wheel, a locking-ratchet all the teeth of which move in the same path concentric with the axis of said wheel, and two pawls which engage their respective ratchets consecutively, the pawl of the stopping-ratchet being independent of said means, substantially as set forth.

44. In a type-writing machine, the combination, with a series of actuating key-levers, a type-wheel, which is moved axially in either direction from an initial point to position its type and then laterally to impress a positioned type during the downward movement of the actuating key-lever, and means for rotating said wheel, of a ratchet device which stops the axial movement of the type-wheel when moving in either direction, and a second ratchet device which locks the type-wheel against any axial movement before the key-lever has completed its downward movement, whereby the wheel may be moved axially in either direction to position a type and then locked to hold it in that position, and then further actuated laterally to impress the type while the key-lever is being depressed.

45. In a type-writing machine, the combination of a type-wheel shaft having a gear-wheel, segmental racks on opposite sides of and continually meshing with said gear-wheel, propelling mechanism for said racks under the control of the key-levers, and said racks being both normally disconnected from and out of operative engagement with their propelling mechanism, substantially as set forth.

46. In a type-writing machine, the combination of a type-wheel shaft having a gear-wheel, segmental racks on opposite sides of said gear-wheel having arms $i'$, with recesses or openings $i^2$ and flanged edges $i^3$, and propelling mechanism for said racks, substantially as set forth.

47. In a type-writing machine, the combination of a type-wheel shaft having a gear-wheel, segmental racks on opposite sides of said gear-wheel, arms $i'$ on said racks, recesses $i^2$, and flanged edges $i^3$ on said arms, cam and fingers $l^4$, and propelling-bails having spring-actuated rods $l$, substantially as set forth.

48. In a type-writing machine, the combination of a type-wheel shaft having a gear-wheel, segmental racks on opposite sides of and in continuous engagement with said gear-wheel, propelling mechanism for and normally out of engagement with the racks, and devices on said racks for limiting the return movement of the racks, and key-levers for said propelling mechanism, substantially as set forth.

49. In a type-writing machine, a type-wheel shaft having a gear-wheel, and segmental racks on opposite sides of said gear-wheel for rotating the shaft in either direction, propelling mechanism for and normally out of engagement with said racks, key-levers controlling said propelling mechanism, and a spring presser-bar for returning the segmental racks to their normal position, substantially as set forth.

50. In a type-writing machine, the combination of a type-wheel shaft having a gear-wheel, freely-supported segmental racks on opposite sides of and in gear with said gear-wheel, right and left propelling bails L L', and mechanism interposed between the bails and the racks, which mechanism is normally out of engagement with said racks, whereby when one of the racks is positively propelled the other is free to move reversely to the propelled rack, substantially as set forth.

51. In a type-writing machine, the combination of a tilting frame, a type-wheel shaft supported on said frame, a gear-wheel on said shaft, segmental racks on opposite sides of the said gear-wheel, propelling mechanism for said racks normally out of engagement with the racks, and a propelling-bail for tilting said frame, substantially as set forth.

52. In a type-writing machine, the combination of a tilting frame E, type-wheel shaft F, mounted in said frame, type-wheel G on shaft F, sliding sleeve J on one of the side bars of frame E, connection between said sleeve and type-wheel, a sliding yoke $J^3$, connection between said yoke and sleeve, and a rocker-shaft in engagement with yoke $J^2$ and under control of finger-levers, substantially as set forth.

53. A tilting or vibrating type-wheel-shaft-supporting frame, shifting mechanism on and moving coincidently with said frame for vertically shifting the type-wheel, and an actuating rocker-shaft K, controlled by finger-levers V V', normally in loose engagement with said shifting mechanism to admit of the shaft K moving with said tilting frame independent of said keys, substantially as set forth.

54. The combination of shaft D, tilting frame E, shaft F, having gear-wheel $H^2$, segmental racks I I' on opposite sides of gear $H^2$ and loosely mounted on said shaft D, bails L L' for said racks, having sliding bars $l$ normally out of engagement with said racks, cam-arms $l^4$ on frame E, and presser-bar $l^3$ engaging with racks I I', substantially as set forth.

55. In a type-writing machine, the combination of a tilting type-wheel-carrying frame, propelling mechanism for said frame, a locking-lever for said frame under the control of a graduated bail, and key-levers, whereby the frame is normally locked until said propelling mechanism is ready for action, substantially as set forth.

56. In a type-writing machine, the combination of tilting frame E, having lug or keeper $n^6$, pivoted lever $n^2$, graduated bail N, link connection between said bail and lever, and a series of key-levers for operating said bail, substantially as set forth.

57. In a type-writing machine, a freely-sliding carriage, a series of spring presser-fingers B, and the support on the machine independent of the paper-carriage, substantially as set forth.

In testimony whereof I affix my signature in presence of two witnesses.

GEORGE C. BLICKENSDERFER.

Witnesses
S. J. VAN STAVOREN,
CHAS. F. VAN HORN.